(12) United States Patent
Zhou et al.

(10) Patent No.: US 12,316,576 B2
(45) Date of Patent: May 27, 2025

(54) ELECTRONIC DEVICE, METHOD, AND STORAGE MEDIUM FOR WIRELESS COMMUNICATION SYSTEM

(71) Applicant: Sony Group Corporation, Tokyo (JP)

(72) Inventors: Zhengyi Zhou, Beijing (CN); Zhaocheng Wang, Beijing (CN); Ning Ge, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 891 days.

(21) Appl. No.: 17/601,956

(22) PCT Filed: Apr. 14, 2020

(86) PCT No.: PCT/CN2020/084604
§ 371 (c)(1),
(2) Date: Oct. 7, 2021

(87) PCT Pub. No.: WO2020/211736
PCT Pub. Date: Oct. 22, 2020

(65) Prior Publication Data
US 2022/0190995 A1 Jun. 16, 2022

(30) Foreign Application Priority Data
Apr. 19, 2019 (CN) .......................... 201910317376.8

(51) Int. Cl.
*H04L 5/00* (2006.01)
*H04J 11/00* (2006.01)
*H04W 72/541* (2023.01)

(52) U.S. Cl.
CPC ........ *H04L 5/0073* (2013.01); *H04J 11/0056* (2013.01); *H04L 5/0085* (2013.01); *H04W 72/541* (2023.01)

(58) Field of Classification Search
CPC .. H04W 72/541; H04L 5/0085; H04L 5/0073; H04J 11/0056
(Continued)

(56) References Cited

U.S. PATENT DOCUMENTS

2012/0275411 A1 11/2012 Kim
2015/0373717 A1* 12/2015 Oh .................... H04W 24/08
370/329

(Continued)

FOREIGN PATENT DOCUMENTS

CN 102594420 A 7/2012
CN 104717001 A 6/2015
(Continued)

OTHER PUBLICATIONS

ATnT, Design of Interference Measurement for NR, 7 pages (Year: 2017).*
(Continued)

*Primary Examiner* — Christopher M Crutchfield
*Assistant Examiner* — Jean F Voltaire
(74) *Attorney, Agent, or Firm* — XSENSUS LLP

(57) ABSTRACT

The present disclosure relates to an electronic device, a method, and a storage medium for a wireless communication system. Various embodiments regarding interference cancellation are described. In one embodiment, an electronic device for a first base station includes a processing circuit, and the processing circuit is configured to: obtain channel information of a channel from a second base station to the first base station; process the channel information to divide the channel; and provide at least portion of processed channel information to the second base station, where at least one of the first base station or the second base station cancels, based on the at least portion of the processed channel information, interference caused from downlink
(Continued)

transmission of the second base station to uplink reception of the first base station.

16 Claims, 20 Drawing Sheets

(58) Field of Classification Search
USPC .......................................................... 370/329
See application file for complete search history.

(56) References Cited

U.S. PATENT DOCUMENTS

2015/0381244 A1   12/2015  Byun
2018/0287739 A1   10/2018  Kim et al.
2019/0319731 A1*  10/2019  Mo ........................ H04B 7/063

FOREIGN PATENT DOCUMENTS

| CN | 104735789 A | 6/2015 |
|---|---|---|
| CN | 104980380 A | 10/2015 |
| CN | 106941464 A | 7/2017 |
| CN | 107070581 A | 8/2017 |
| WO | WO-2016026107 A1 | 2/2016 |

OTHER PUBLICATIONS

International Search Report and Written Opinion mailed on Jul. 17, 2020, received for PCT Application PCT/CN2020/084604, Filed on Apr. 14, 2020, 8 pages including English Translation.
AT&T, "Design of Interference Measurement for NR", 3GPP TSG RAN WG1 Meeting #88, R1-1702296, Feb. 13-17, 2017, 7 pages.

* cited by examiner

Table 1. Example of uplink-downlink time configurations

| Time \ Base station | $T$ | $2T$ | $3T$ | $4T$ | $5T$ | $6T$ | $7T$ | ... |
|---|---|---|---|---|---|---|---|---|
| 101 | DL | DL | UL | UL | UL | UL | UL | ... |
| 102 | DL | DL | DL | DL | DL | DL | UL | ... |
| ... | ... | ... | ... | ... | ... | ... | ... | ... |
| 102-5 | DL | DL | DL | DL | UL | UL | UL | ... |

FIG. 2

Table 2. Interference time information 1 (first base station 101)

| Time | Interference-related base station | Type |
|---|---|---|
| $T$ | — | — |
| $2T$ | — | — |
| $3T$ | 102, ...,102-5 | Interfered party |
| $4T$ | 102, ...,102-5 | Interfered party |
| $5T$ | 102, ... | Interfered party |
| $6T$ | 102, ... | Interfered party |
| $7T$ | — | — |
| ... | ... | ... |

Table 3. Interference time information 2 (second base station 102)

| Time | Interfering base station | Type |
|---|---|---|
| $T$ | — | — |
| $2T$ | — | — |
| $3T$ | 101, ... | Interfering party |
| $4T$ | 101, ... | Interfering party |
| $5T$ | 101, ...,102-5 | Interfering party |
| $6T$ | 101, ...,102-5 | Interfering party |
| $7T$ | — | — |
| ... | ... | ... |

```
┌─────────────────────────────────────────┐
│ Obtain channel information of a channel from │  905
│ a second base station to a first base station │
└─────────────────────────────────────────┘
                    │
                    ▼
┌─────────────────────────────────────────┐
│ Process the channel information to divide the │  910
│                channel                        │
└─────────────────────────────────────────┘
                    │
                    ▼
┌─────────────────────────────────────────┐
│ Cancel interference from the second base      │
│ station to the first base station based on at │  915
│ least portion of processed channel information│
└─────────────────────────────────────────┘
```

```
┌─────────────────────────────────────────┐
│  Receive at least portion of processed channel  │  945
│    information from a first base station        │
└─────────────────────────────────────────┘
                    │
                    ▼
┌─────────────────────────────────────────┐
│ Cancel interference from a second base station to │
│ the first base station based on at least portion of │  950
│        processed channel information             │
└─────────────────────────────────────────┘
```

FIG. 9B

ELECTRONIC DEVICE, METHOD, AND STORAGE MEDIUM FOR WIRELESS COMMUNICATION SYSTEM

CROSS-REFERENCE TO RELATED APPLICATIONS

The present application is based on PCT filing PCT/CN2020/084604, filed Apr. 14, 2020, which claims priority to CN 201910317376.8, filed Apr. 19, 2019, the entire contents of each are incorporated herein by reference.

TECHNICAL FIELD

The present disclosure generally relates to a wireless communication system and a wireless communication method, and specifically, to an interference cancellation technology.

BACKGROUND

With development and application of the wireless communication technologies, people's needs for voice and data communication have been unprecedentedly met. In order to provide even higher communication quality and capacity, a wireless communication system employs various technologies at different layers. The duplex technology has a time division duplex (TDD) mode. In TDD mode, uplink and downlink using the same frequency band may be separated in time (namely time division). For example, in a TDD wireless communication system, time resources may be allocated for uplink and downlink in different proportions, and uplink and downlink transmissions are performed on the same frequency channel (for example, carrier) based on the allocated time resources, to separate uplink from downlink.

Compared with a frequency division duplex (FDD) mode in which symmetrical frequency bands need to be configured for uplink and downlink transmission, flexible allocation of time resources for uplink and downlink transmissions in the TDD mode is more suitable for asymmetric services, thereby improving spectrum utilization. For example, in the TDD mode, a larger proportion of downlink time resources may be allocated for download services with large data volumes. In addition, in the TDD wireless communication system, uplink and downlink channels feature reciprocity, which can reduce overheads for channel estimation and is helpful for a system using massive antenna arrays.

Conventionally, base stations in the TDD wireless communication system use a same uplink-downlink time configuration, and uplink and downlink transmissions may be synchronized in respective cells. Further considering service characteristics of different cells, for example, a more flexible duplex mode can be employed in a 5G communication system (such as a New Radio (NR) system). The flexible duplex mode is based on TDD mode, and also allows each cell/base station to use a variety of flexible uplink-downlink time configurations based on its own service characteristics and to use OFDM symbol in place of slot as a minimum time resource allocation unit.

In the flexible duplex mode, resource allocation better adapts to service characteristics, improving spectrum utilization and system performance. However, interference may occur between uplink and downlink of neighboring cells/base stations when the neighboring base stations use different uplink-downlink time configurations. Such interference is sometimes referred to as cross-link interference (CLI). A technical means for cancelling such interference is required.

SUMMARY

A first aspect of the present disclosure relates to an electronic device for a first base station. The electronic device includes a processing circuit, and the processing circuit is configured to: obtain channel information of a channel from a second base station to the first base station; process the channel information to divide the channel; and provide at least portion of processed channel information to the second base station, where at least one of the first base station or the second base station cancels, based on the at least portion of the processed channel information, interference caused from downlink transmission of the second base station to uplink reception of the first base station.

A second aspect of the present disclosure relates to an electronic device for a second base station. The second base station is used to work along with the first base station in the previous aspect. The electronic device includes a processing circuit, and the processing circuit is configured to: receive at least portion of processed channel information from the first base station; and cancel, based on the at least portion of the processed channel information, interference caused from downlink transmission of the second base station to uplink reception of the first base station.

A third aspect of the present disclosure relates to an electronic device for a second base station. The electronic device includes a processing circuit, and the processing circuit is configured to: obtain channel information of a channel from the second base station to a first base station; process the channel information to divide the channel; and provide at least portion of processed channel information to the first base station, where at least one of the first base station or the second base station cancels, based on the at least portion of the processed channel information, interference caused from downlink transmission of the second base station to uplink reception of the first base station.

A fourth aspect of the present disclosure relates to a method for wireless communication. The method includes the following operations performed by a first base station: obtaining channel information of a channel from a second base station to the first base station; processing the channel information to divide the channel; and providing at least portion of processed channel information to the second base station, where at least one of the first base station or the second base station cancels, based on at least portion of the processed channel information, interference caused from downlink transmission of the second base station to uplink reception of the first base station.

A fifth aspect of the present disclosure relates to a method for wireless communication. The method includes the following operations performed by a second base station: receiving at least portion of processed channel information from a first base station; and cancelling, based on the at least portion of the processed channel information, interference caused from downlink transmission of the second base station to uplink reception of the first base station, where the first base station is configured to perform the methods according to various embodiments of the present disclosure.

A sixth aspect of the present disclosure relates to a computer-readable storage medium having one or more instructions stored thereon. In some embodiments, the one or more instructions may, when executed by one or more processors of an electronic device, cause the electronic device to perform the methods according to various embodiments of the present disclosure.

A seventh aspect of the present disclosure relates to an apparatus for wireless communication, including components or units for performing operations of the methods according to the embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in conjunction with the accompanying drawings. The same or similar reference numerals are used in the accompanying drawings to denote the same or similar components. The accompanying drawings together with the following detailed description are included in the specification and form a part of the specification, and are intended to exemplify the embodiments of the present disclosure and explain the principles and advantages of the present disclosure. In the accompanying drawings:

FIG. 2 illustrates an example of uplink-downlink time configurations for base stations in FIG. 1.

FIG. 8 illustrates an example of interference time information according to an embodiment of the present disclosure.

FIG. 9A to FIG. 9C illustrate an example method for communication according to an embodiment of the present disclosure.

Although the embodiments described in the present disclosure may have various modifications and alternatives, specific embodiments thereof are illustrated as examples in the accompany drawings and described in detail in this specification. It should be understood that the drawings and detailed description thereof are not intended to limit embodiments to the specific forms disclosed, but to cover all modifications, equivalents, and alternatives falling within the spirit and scope of the claims.

DETAILED DESCRIPTION

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
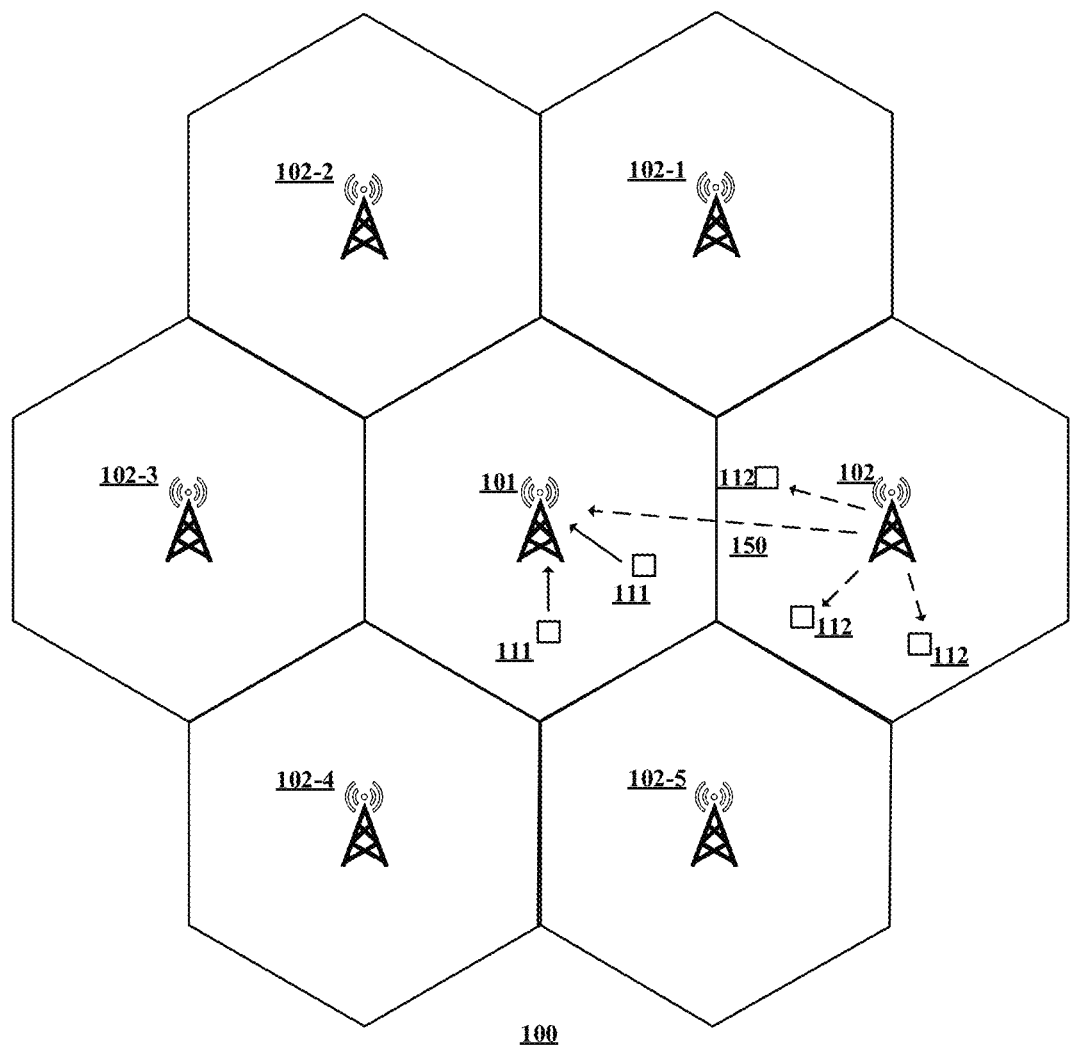
FIG. 1 illustrates an example of interference in a wireless communication system according to an embodiment of the present disclosure.

FIG. 1 illustrates an example of interference in a wireless communication system according to an embodiment of the present disclosure. It should be understood that FIG. 1 illustrates only one of multiple types and possible layouts of wireless communication systems, and features of the present disclosure can be implemented in any one of the various systems based on actual needs.

As shown in FIG. 1, a wireless communication system 100 includes base stations 101, 102, and 102-1 to 102-5 and one or more terminals 111 and 112. The base stations and the terminals may be configured to communicate through a transmission medium. The base station (for example, 101 or 102) may be further configured to communicate with a network (for example, a core network of a cellular service provider, a telecommunications network such as a public switched telephone network (PSTN), and/or the Internet, which is not shown). Therefore, the base stations (for example, 101 and 102) may facilitate communication between the terminals (for example, 111 and 112) and/or between the terminal (for example, 111 and 112) and the network It should be understood that the term base station herein has the full breadth of its normal meaning, and at least includes a wireless communication station serving as a part of a wireless communication system or a radio system, to facilitate communication. Examples of a base station may include but are not limited to the following: at least one of a base transceiver station (BTS) and a base station controller (BSC) in a GSM system; at least one of a radio network controller (RNC) and a Node B in a WCDMA system; eNBs in LTE and LTE-Advanced systems; access points (APs) in WLAN and WiMAX systems; and corresponding network nodes in communication systems to be developed or under development (for example, a gNB in a 5G New Radio (NR) system or an eNB in eLTE). Part of functions of a base station herein can also be implemented as an entity that has control functions on communication in the D2D, M2M, and V2V communication scenarios, or as an entity that plays a role of spectrum coordination in the cognitive radio communication scenario.

The term terminal herein has the full breadth of its normal meaning, for example, a terminal may be a mobile station (MS), user equipment (UE), and so on. A terminal can be implemented as a device such as a mobile phone, a handheld device, a media player, a computer, a laptop or a tablet, or a wireless device of almost any type. In some cases, a terminal may communicate using multiple wireless communication technologies. For example, a terminal may be configured to communicate using two or more of GSM, UMTS, CDMA2000, WiMAX, LTE, LTE-A, WLAN, NR, Bluetooth, and so on. In some cases, a terminal may alternatively be configured to communicate using only one wireless communication technology.

In FIG. 1, the base station (for example, 101 or 102) may perform operations based on one or more wireless communication technologies to provide continuous or nearly continuous radio signal coverage to the terminal (for example, 111 or 112) and similar devices in a specific geographic area. A coverage of the base station is generally referred to as a cell. Although shown as having the same size, cells of different base stations may have different sizes. For example, during deployment of a heterogeneous network, the base station 101 may provide a micro cell coverage, and the base station 102 may provide a macro cell coverage. In FIG. 1, the terminal 111 is located in a cell of the base station 101, and may receive a downlink signal from the base station 101. For the terminal 111, a downlink signal from a neighboring base station (for example, 102) may mean interference. The terminal 112 is located in a cell of the base station 102, and may receive a downlink signal from the base station 102. For the terminal 112, a downlink signal from a neighboring base station (for example, 101) also means interference.

At least one base station in the wireless communication system 100 may use the flexible duplex mode based on its own service characteristics. For example, in order to meet a relatively large uplink transmission requirement, the base station 101 may configure a larger uplink-downlink time ratio (which is, for example, greater than 1). The base station 102 may configure a conventional uplink-downlink time ratio (which is, for example, equal to 1), or configure a smaller uplink-downlink time ratio (which is, for example, less than 1) to meet a relatively large downlink transmission requirement. In this case, there are moments at which uplink and downlink transmissions are asynchronized between neighboring base stations (or cells thereof).

As shown in FIG. 1, based on respective uplink-downlink time configurations, there is a specific moment at which uplink transmission is being performed in the cell of the base station 101 while downlink transmission is being performed in the cell of the base station 102. The base station 101 receives an uplink signal (a wanted signal) from the terminal 111 in the local cell, and also receives (for example, through an interference channel 120 from the base station 102 to the base station 101) a downlink signal (an interfering signal) from the neighboring base station 102. Because a transmit power of the base station is usually higher than that of the terminal, the interference caused from downlink transmission of the neighboring base station 102 to uplink reception of the base station 101 imposes significant impact on correct reception of signals of the terminal by the base station 101.

Although not shown, it can be anticipated that there is also a specific moment at which the base station 101 is performing downlink transmission while uplink transmission is being performed in the cell of the base station 102. When receiving a downlink signal (a wanted signal) from the base station 101, the terminal 111 also receives an uplink signal (an interfering signal) from the terminal 112 in the neighboring cell. In this case, because the transmit power of the terminal is relatively small, the interference caused from the uplink transmission of the terminal 112 in the neighboring cell to the downlink reception of the terminal 111 is also relatively small. The interference between the uplink and downlink of the two neighboring cells may be referred to as cross-link interference. The first case corresponds to cross-link interference between the base stations, and the second case corresponds to cross-link interference between the terminals.

It should be understood that mutual interference occurs between uplink and downlink of the neighboring base stations. In the wireless communication system 100, there is a moment at which downlink transmission of the base station 101 may cause interference to uplink reception of the base station 102, or uplink transmission of the terminal 111 may cause interference to downlink reception of the terminal 112. In the present disclosure, the embodiments are described with more reference to interference caused from the base station 102 (downlink transmission) to the base station 101 (uplink reception). However, it should be understood that the operations in the embodiments are also applicable to interference caused from the base station 101 to the base station 102, only necessary to exchange positions of the two base stations in operation.

It should be further understood that interference occurs between a plurality of neighboring base stations. In this disclosure, the embodiments are described with more reference to interference between the base station 102 and the base station 101. However, it should be understood that the operations in the embodiments are also applicable to interference between the base station 101 or the base station 102 and other base stations. In the following description, for clarity, the base station 101 is sometimes referred to as a first base station and the base station 102 is referred to as a second base station.

FIG. 2 illustrates an example of uplink-downlink time configurations for the base stations in FIG. 1, where T is a unit time. T may correspond to a time resource allocation unit, such as one or more slots or OFDM symbols. Table 1 in FIG. 2 shows only an uplink-downlink time allocation pattern of each base station from T to 7T. For the base station 101, T and 2T are used for downlink, and 3T to 7T are used for uplink. For the base station 102, T to 6T are used for downlink, and 7T are used for uplink. For the base station 102-5, T to 4T are used for downlink, and 5T to 7T are used for uplink. The uplink-downlink time allocation pattern may be repeated subsequently. Certainly, the uplink-downlink time allocation pattern may alternatively have other periodicities different from 7T.

For example, at a moment 3T, uplink and downlink transmissions are reverse between the base station 101 and the neighboring base stations 102 or 102-5, and downlink transmission of the neighboring base stations 102 and 102-5 may cause interference to uplink reception of the base station 101. In this embodiment of the present disclosure, at least one of the first base station 101 and the second base station 102 may cancel interference from the downlink transmission of the second base station 102 to the uplink reception of the first base station 101 based on processing of channel information of a channel between the base stations. Similar terms such as "cancelling interference" and "cancelling or reducing interference" are used in the present disclosure. These terms should be all understood as cancelling all or at least part of interference, unless the understanding is not logical.

Figure 3A:
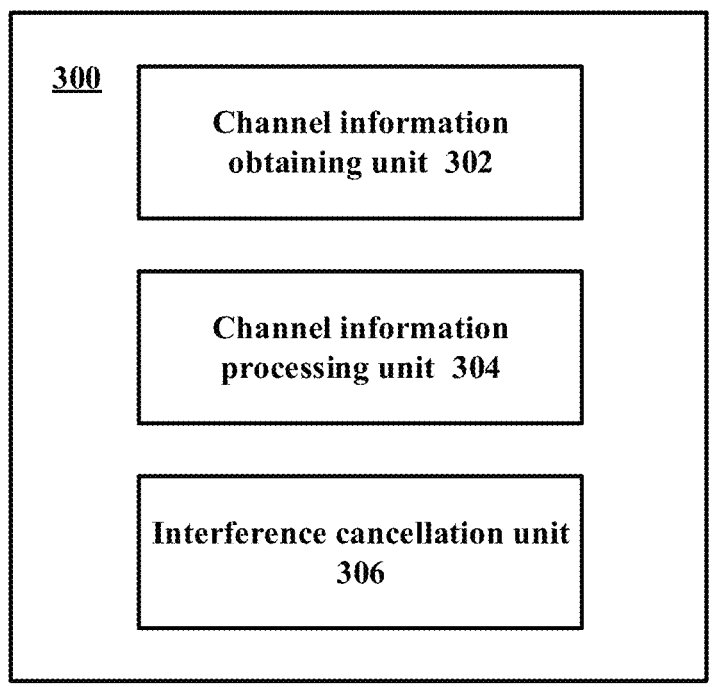
FIG. 3A illustrates an exemplary electronic device for a first base station according to an embodiment of the present disclosure.

FIG. 3A illustrates an exemplary electronic device 300 for a first base station 101 according to an embodiment of the present disclosure. The electronic device 300 shown in FIG. 3A may include various units to implement various embodiments according to the present disclosure. In this example, the electronic device 300 includes a channel information obtaining unit 302, a channel information processing unit 304, and an interference cancellation unit 306. In one implementation, the electronic device 300 is implemented as the base station 101 itself or a part thereof, or as a device (such as a base station controller) or a part of the device used to control the base station 101 or otherwise related to the base station 101. Various operations described below with reference to the base station may be implemented by the units 302 to 306 of the electronic device 300 or other possible units (for example, a transceiver unit).

In an embodiment, the channel information obtaining unit 202 may be configured to obtain channel information of a channel (for example, an interference channel 150) from the second base station 102 to the first base station 101. The channel information processing unit 204 may be configured to process the channel information to divide the interference channel. The interference cancellation unit 206 may be configured to cancel the interference from the downlink transmission of the second base station 102 to the uplink reception of the first base station 101 (also referred to as cross-link interference between the second base station 102 and the first base station 101) based on at least portion of the processed channel information. Alternatively or additionally, the electronic device 300 may provide at least portion of the processed channel information to the second base station 102 (for example, by using the transceiver unit), and the second base station 102 may cancel cross-link interference from the base station 102 to the first base station 101 based on the at least portion of the processed channel information.

Figure 3B:
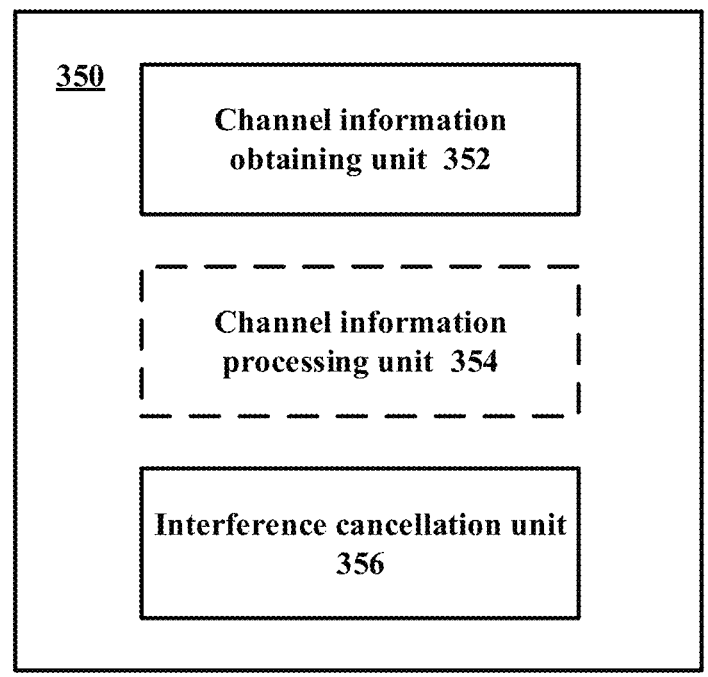
FIG. 3B illustrates an exemplary electronic device for a second base station according to an embodiment of the present disclosure.

FIG. 3B illustrates an exemplary electronic device 350 for a second base station 102 according to an embodiment of the present disclosure. The electronic device 350 shown in FIG. 3B may include various units to implement various embodiments according to the present disclosure. In this example, the electronic device 350 includes a channel information obtaining unit 352 and an interference cancellation unit 356. Optionally (in the present disclosure, unless explicitly stated in text, the dotted lines in the figures are generally used to indicate optionality), the electronic device 350 further includes a channel information processing unit 354. In one implementation, the electronic device 350 is implemented as the base station 102 itself or a part thereof, or as a device (such as a base station controller) or a part of the device used to control the base station 102 or otherwise related to the base station 102. Various operations described below with reference to the base station may be implemented by the units 352 to 356 of the electronic device 350 or other possible units (for example, a transceiver unit).

In an embodiment, the channel information obtaining unit 352 may be configured to receive at least portion of processed channel information of an interference channel 150 from the first base station 101. The interference cancellation unit 356 may be configured to cancel the cross-link interference from the second base station 102 to the first base station 101 based on the at least portion of the processed channel information.

Alternatively or additionally, the electronic device 350 may include the channel information processing unit 354. In one embodiment, the electronic device 350 may obtain the channel information of the interference channel 150 (for example, by using the channel information obtaining unit 352). The channel information processing unit 354 (similar to the channel information processing unit 304) may be configured to process the channel information to divide the interference channel, and the interference cancellation unit 356 cancels the cross-link interference from the second base station 102 to the first base station 101.

In some embodiments, the electronic devices 300 and 350 may be implemented at the chip level, or may be implemented at the device level by including other external components (such as radio links and antennas). For example, each electronic device can work as a communication device as a whole machine.

It should be understood that the foregoing various units are only logical modules divided based on logical functions to be implemented by the units, and are not intended to limit specific implementations, for example, the units may be implemented by software, hardware, or a combination of software and hardware. In actual implementation, the above various units may be implemented as independent physical entities, or may be implemented by a single entity (for example, a processor (CPU, DSP, or the like), or an integrated circuit). The processing circuitry may refer to various implementations of a digital circuitry, an analog circuitry, or a mixed signal (combination of analog and digital) circuitry that perform functions in a computing system. The processing circuitry can include, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

According to some embodiments, after the channel information of the interference channel 150 from the second base station 102 to the first base station 101 is obtained, at least one of the first base station 101 or the second base station 102 may cancel or reduce the cross-link interference from the second base station 102 to the first base station 101 based on the channel information. In one embodiment, the first base station 101 may cancel or reduce interference based on the at least portion of the channel information during uplink reception, for example, using the channel information for reception combining. In one embodiment, the second base station 102 may cancel or reduce interference based on the at least portion of the channel information during downlink transmission, for example, using the channel information for transmission precoding. In one embodiment, as a combination of the foregoing two manners, the first base station 101 may cancel or reduce the interference based on the at least portion of the channel information during uplink reception and the second base station 102 may cancel or reduce the interference based on the at least portion of the channel information during downlink transmission, for example, using portion of the channel information for reception combining and transmission precoding respectively.

Figure 4A:
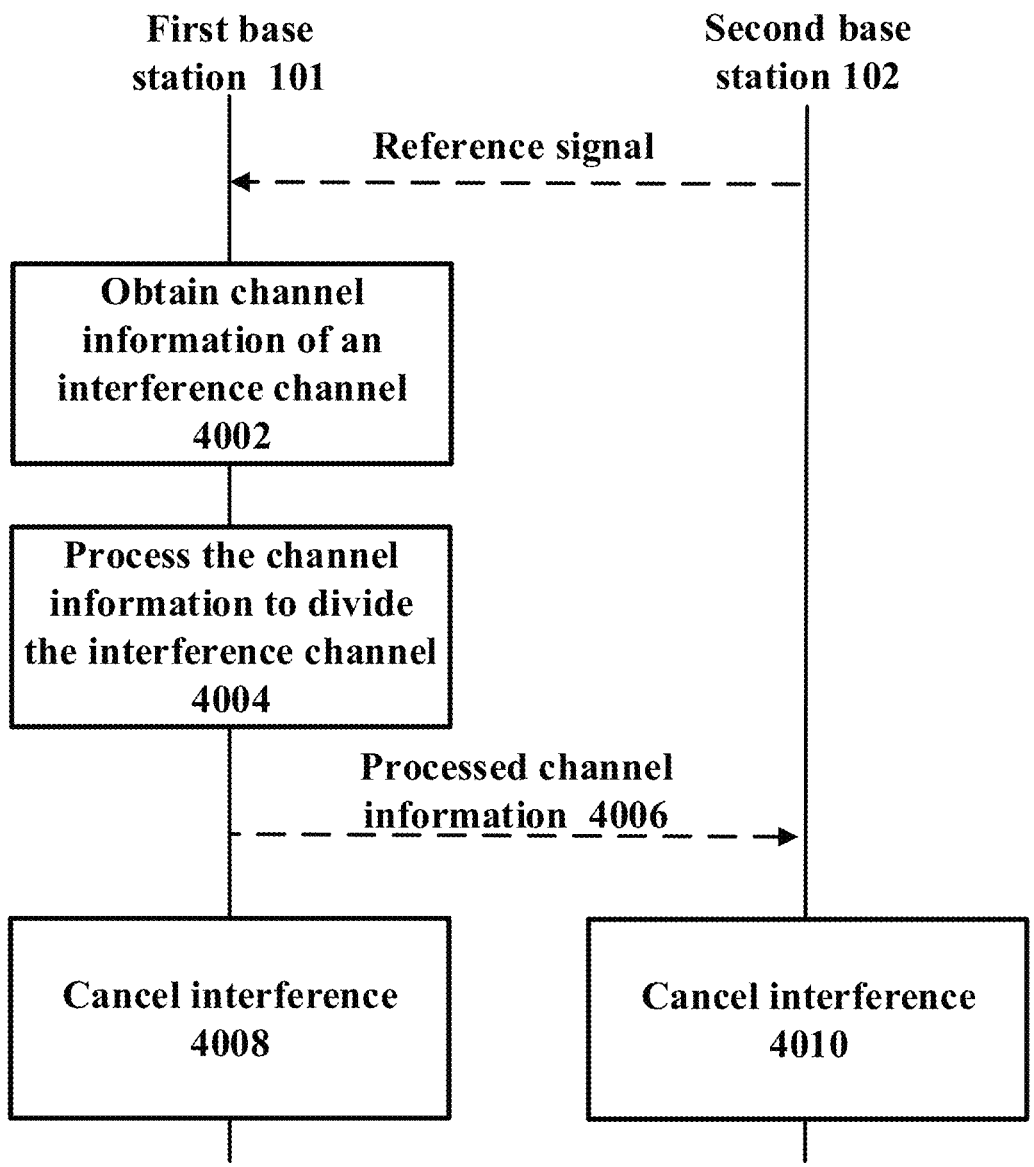
FIG. 4A to FIG. 4C illustrate an example process of interference cancellation according to an embodiment of the present disclosure.

FIG. 4A illustrates a first example process of interference cancellation according to an embodiment of the present disclosure. This example process can be executed by the electronic device 300 and the electronic device 350 described above.

As shown in FIG. 4A, in 4002, a first base station 101 may obtain channel information of an interference channel from a second base station 102 to the first base station 101 (for example, by using a channel information obtaining unit 302). For example, the first base station 101 may obtain the channel information by measuring a downlink reference signal received from the second base station 102 or based on prior information estimation. In 4004, the first base station 101 may process the channel information (for example, by using a channel information processing unit 304) to divide the interference channel. In 4008, the first base station 101 may cancel cross-link interference from the second base station 102 based on at least portion (for example, a first portion) of the processed channel information (for example, by using an interference cancellation unit 306).

In one embodiment, additionally or alternatively, in 4006, the first base station 101 may provide the processed channel information to the second base station 102 (for example, by using a transceiver unit). In 4010, the second base station 102 may cancel the cross-link interference to the first base station 101 based on at least portion (for example, a second portion) of the processed channel information. In an embodiment, the cross-link interference from the second base station 102 to the first base station 101 may be cancelled or reduced only through the operation 4008 or operation 4010, or the interference may be cancelled or reduced through both the operation 4008 and the operation 4010. In the latter case, the first portion of the processed channel information is different from the second portion of the processed channel information, as described in detail below.

Figure 4B:
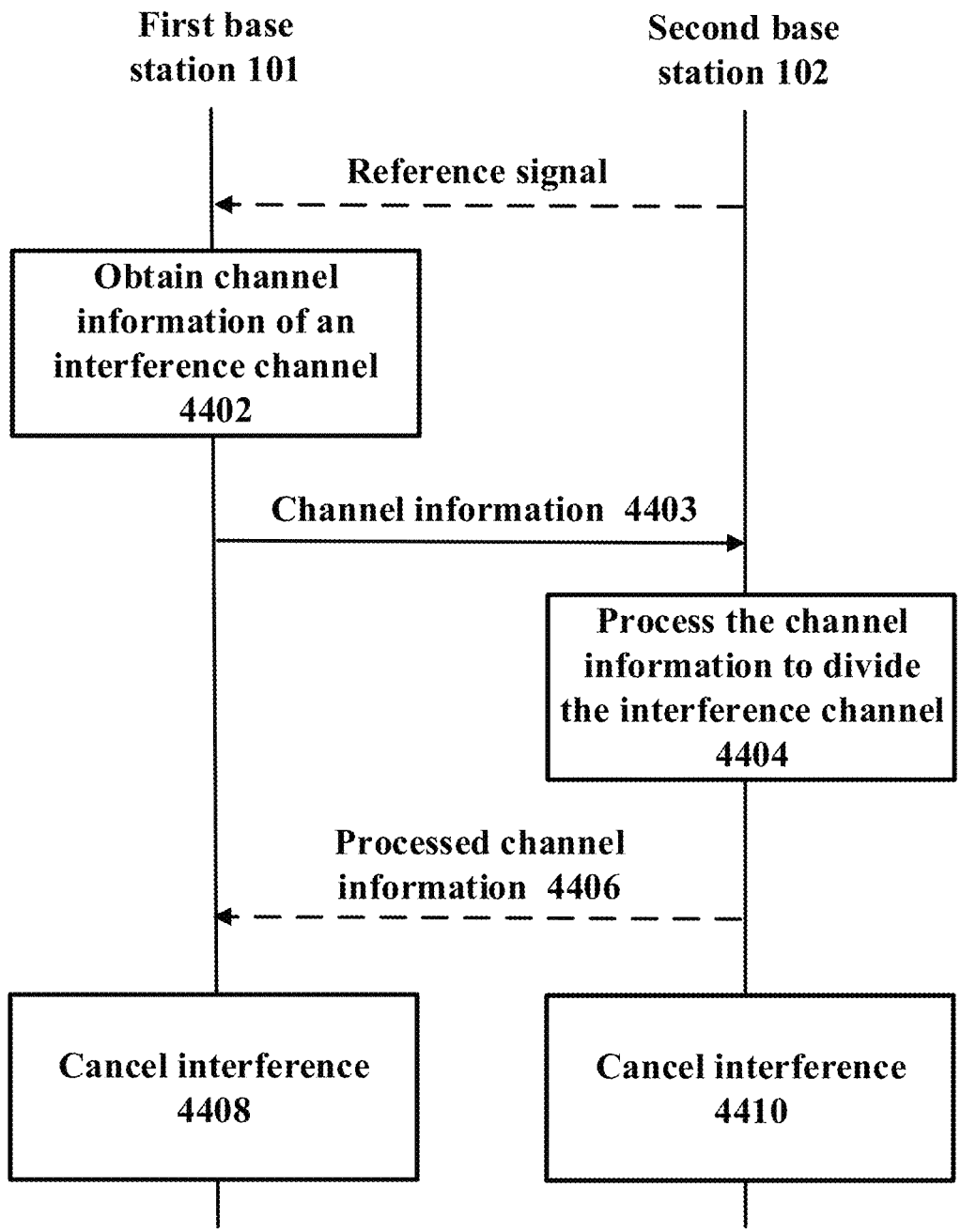

FIG. 4B illustrates a second example process of interference cancellation according to an embodiment of the present disclosure. This example process can be executed by the electronic device 300 and the electronic device 350 described above.

FIG. 4B can be understood with reference to the example of FIG. 4A. The difference between the two lies in that a second base station 102 processes channel information in FIG. 4B. As shown in FIG. 4B, after obtaining (in 4402) channel information of an interference channel from the second base station 102 to a first base station 101, the first base station 101 provides (in 4403) the channel information to the second base station 102 for processing. In 4404, the second base station 102 may process the channel information (for example, by using a channel information processing unit 354) to divide the interference channel. In 4410, the second base station 102 may cancel cross-link interference to the first base station 101 based on at least portion (for example, a second portion) of the processed channel information (for example, by using an interference cancellation unit 356).

In one embodiment, additionally or alternatively, in 4406, the second base station 102 may provide the processed channel information to the first base station 101 (for example, by using a transceiver unit). In 4408, the first base station 101 may cancel the cross-link interference from the second base station 102 based on at least portion (for example, a first portion) of the processed channel information. In an embodiment, the cross-link interference from the second base station 102 to the first base station 101 may be cancelled or reduced only through the operation 4410 or the operation 4408, or the interference may be cancelled or reduced through both the operation 4410 and the operation 4408. In the latter case, the first portion of the processed channel information is different from the second portion of the processed channel information, as described in detail below.

Figure 4C:
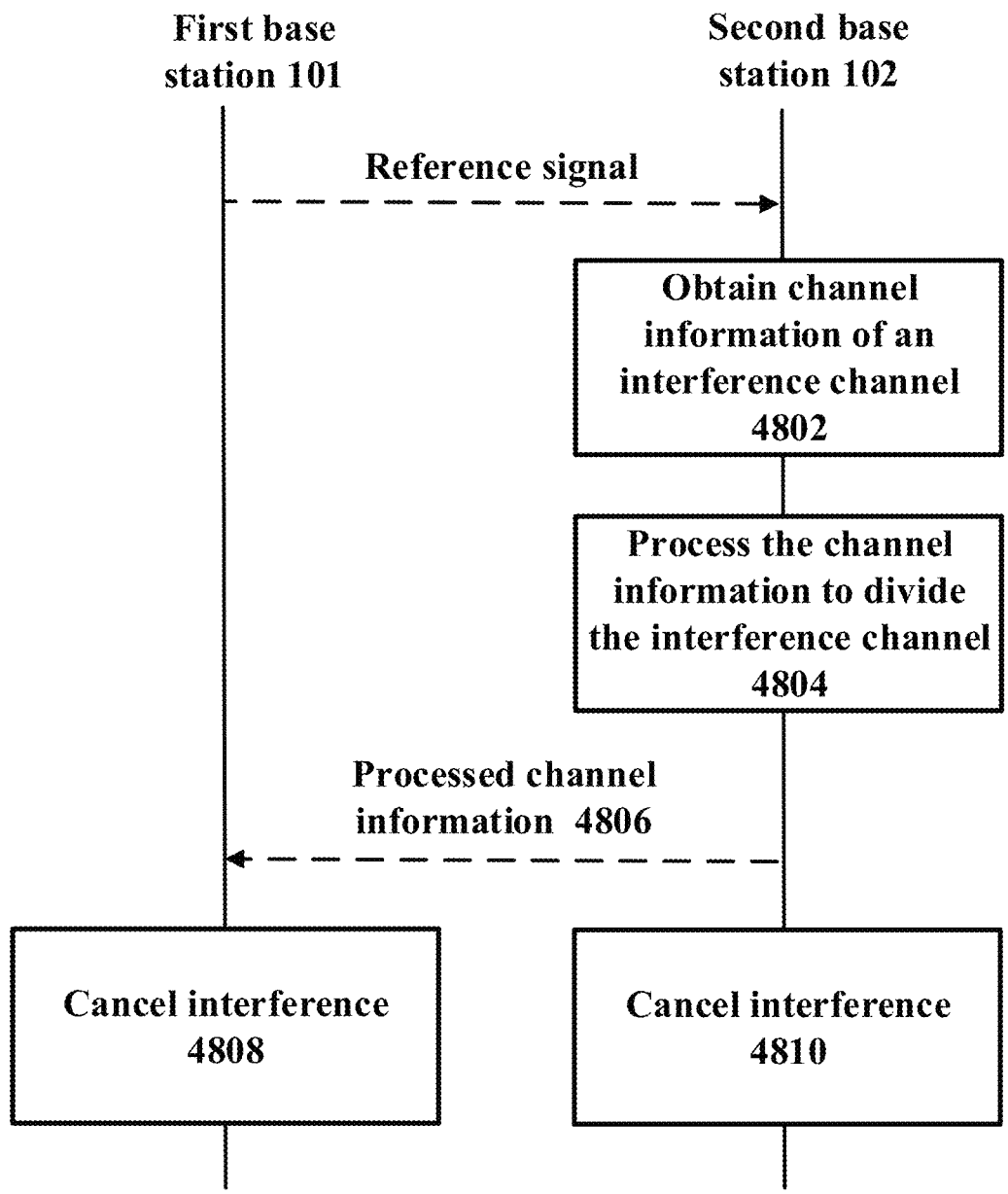

FIG. 4C illustrates a third example process of interference cancellation according to an embodiment of the present disclosure. This example process can be executed by the electronic device 300 and the electronic device 350 described above.

FIG. 4C is characterized in that a second base station 102 obtains channel information of an interference channel and processes the channel information. As shown in FIG. 4C, in 4802, the second base station 102 obtains the channel information of the interference channel from the second base station 102 to a first base station 101. For example, the second base station 102 may estimate the channel information based on prior information about deployment of the base station. Alternatively, in a case that channels between the base stations are approximately reciprocal, the second base station 102 may estimate the channel information of the interference channel from the second base station 102 to the first base station 101 by measuring a downlink reference signal of the first base station 101. The following operations in FIG. 4C can be understood by referring to FIG. 4B, and details are not repeated herein.

The example electronic devices and the operations performed according to this embodiment of the present disclosure are briefly described above with reference to FIGS. 3A to 4C. The following describes the operations in detail.

Obtaining Channel Information

It should be understood that the term channel information in this specification has the full breadth of its normal meaning. The channel information may include channel state information (CSI), and may be represented by a channel matrix. In a multi-antenna system, the first base station 101 may be configured with $N_R$ receive antennas, and the second base station 102 may be configured with $N_T$ transmit antennas. Correspondingly, the interference channel information from the second base station 102 to the first base station 101 may be denoted by an $N_T \times N_R$ channel matrix H.

In an embodiment, the first base station 101 may obtain the channel information of the interference channel by measuring the downlink reference signal of the second base station 102. The downlink reference signal herein may be a conventional reference signal (for example, a CSI-RS) used by the second base station 102 for downlink synchronization, or a reference signal dedicated to channel measurement between base stations. For example, in a wireless communication system such as NR, specific time-frequency resources may be allocated for transmission of such dedicated reference signals. The first base station 101 may obtain the channel information based on the reference signal in any suitable manner, and the present disclosure is not limited thereto.

In an embodiment, the channel information of the interference channel from the second base station 102 to the first base station 101 may be estimated based on prior information related to the deployment of the base station. For example, the first base station 101 or the second base station 102 may learn location information of a neighboring base station (for example, based on a neighboring cell list in the system), and estimate a distance away from the neighboring base station based at least on a location relationship with the neighboring base station. For another example, the first base station 101 or the second base station 102 may obtain a multi-antenna configuration of the neighboring base station, and obtain dimensional information of the channel matrix with reference to its own multi-antenna configuration.

Relative locations of the base stations are usually fixed, and there is a relatively strong line-of-sight (LOS) path between the base stations. Therefore, an interference channel usually presents spatial characteristics dominated by the LOS path. This is more obvious in high frequency bands such as millimeter waves. When the path loss is relatively large and there are few reflection paths, the characteristics of the interference channel and the direction of the LOS path feature greater correlation. In this case, it is appropriate to estimate the channel information based on prior information such as the relative locations between the base stations and statistical characteristics of the interference channel, so as to meet the requirement for interference cancellation.

Processing Channel Information (or Dividing the Interference Channel)

In this embodiment, processing the channel information of the interference channel 150 includes decomposing a channel matrix of the interference channel. For example, a decomposition manner may include singular value (SVD) decomposition, orthogonal triangle (QR) decomposition, Schur (Schur) decomposition, or the like. Mathematical processing of the channel information corresponds to physical division of the interference channel. The interference channel is physically divided into minimum channel units by decomposing the channel matrix of the interference channel into sub-channel matrices. In some cases, the minimum channel unit may be a single path in a multipath channel. Therefore, in the present disclosure, the sub-channel matrix corresponds to the minimum channel unit of the interference channel, and a sum of a plurality of sub-channel matrices may form an entire channel matrix of the interference channel.

Correspondingly, that the first base station 101 provides at least portion of the processed channel information to the second base station 102 includes: providing at least portion of a plurality of sub-channel matrices obtained through division of a first channel matrix to the second base station 102, where the providing may be performed through at least one of a wireless link or a wired interface (for example, an X2 interface) between the base stations.

[SVD Decomposition Example]

The following formula is an example of decomposing the matrix of the interference channel (denoted as $H_{agg}$) through SVD decomposition.

$$H_{agg} = U\sum V^H = \begin{bmatrix} | & \cdots & | \\ u_1 & \cdots & u_L \\ | & \cdots & | \end{bmatrix} \begin{bmatrix} \sigma_1 & \cdots & 0 \\ \vdots & \ddots & \vdots \\ 0 & \cdots & \sigma_L \end{bmatrix} \begin{bmatrix} - & v_1^H & - \\ \vdots & \vdots & \vdots \\ - & v_L^H & - \end{bmatrix}$$

Where, $U_i$ is a column vector of the matrix U, $V_i$ is a column vector of the matrix V, and $\sigma_i$ is a diagonal element of the diagonal matrix $\Sigma$. The number of receive antennas of the first base station 101 is denoted by $N_R$, and the number of transmit antennas of the second base station 102 is denoted by $N_T$. For ease of description, $N_T=N_R=L$ is used herein. Based on the SVD decomposition in the above formula, $H_{agg}$ is changed as follows:

$$H_{agg} = \sum_{i=1}^{L} \sigma_i u_i v_i^H = \sigma_1 u_1 v_1^H + \ldots + \sigma_L u_L v_L^H$$

Therefore, the channel matrix $H_{agg}$ of the interference channel is decomposed into the sum of the sub-channel matrices $\sigma_i u_i v_i^H$. Here, each sub-channel matrix has a form of matrix multiplication (which is $\sigma_i u_i v_i^H$).

[QR Decomposition Example]

The following formula is an example of decomposing the matrix $H_{agg}$ of the interference channel through QR decomposition.

$$H_{agg} = QR = \begin{bmatrix} | & \cdots & | \\ q_1 & \cdots & q_L \\ | & \cdots & | \end{bmatrix} \begin{bmatrix} - & r_1^T & - \\ \vdots & \vdots & \vdots \\ - & r_L^T & - \end{bmatrix}$$

Where, the matrix Q is a unitary matrix, that is, $Q^H Q = I$; $q_i$ is a column vector of the matrix Q, a matrix R is an upper triangular matrix, and $r_1^T$ is a row vector of the matrix R. For ease of description, $N_T=N_R=L$ is also used. Based on the QR decomposition in the above formula, $H_{agg}$ is changed as follows:

$$H_{agg} = \sum_{i=1}^{L} q_i r_i^H = q_1 r_1^T + \ldots + q_L r_L^T$$

Therefore, the channel matrix $H_{agg}$ of the interference channel is decomposed into the sum of the sub-channel matrices $q_i r_i^T$. Here, each sub-channel matrix has a form of matrix multiplication.

[Schur Decomposition Example]

The following formula is an example of decomposing the matrix $H_{agg}$ of the interference channel through Schur decomposition.

$$H_{agg} = URU^H = \begin{bmatrix} | & \cdots & | \\ u_1 & \cdots & u_L \\ | & \cdots & | \end{bmatrix} \begin{bmatrix} r_{1,1} & \cdots & r_{1,L} \\ \vdots & \ddots & \vdots \\ 0 & \cdots & r_{L,L} \end{bmatrix} \begin{bmatrix} - & u_1^H & - \\ \vdots & \vdots & \vdots \\ - & u_L^H & - \end{bmatrix}$$

Where, the matrix U is a unitary matrix, that is, $U^H U = I$; $U_i$ is a column vector of the matrix U, a matrix R is an upper triangular matrix, and $r_{i,k}$ is an element at a corresponding position of the matrix R. For ease of description, $N_T=N_R=L$ is also used. Based on the Schur decomposition in the above formula, $H_{agg}$ is changed as follows:

$$H_{agg} = \sum_{i=1}^{L}\left(\sum_{j=i}^{L} r_{i,j} u_i u_j^H\right) = \sum_{j=1}^{L} r_{1,1} u_1 u_j^H + \ldots + r_{L,L} u_L u_L^H$$

Therefore, the channel matrix $H_{agg}$ of the interference channel is decomposed into the sum of the sub-channel matrices $\sum_{j=i}^{L} r_{i,j} u_i u_j^H$. Here, each sub-channel matrix has a form of matrix multiplication.

The following describes an example manner of interference cancellation.

Interference Cancellation Through Precoding by the Second Base Station 102

In this embodiment, the second base station 102 may be configured to design a precoding matrix based on one or more of the plurality of sub-channel matrices (for example, $\sigma_i u_i v_i^H$) obtained through division of the channel matrix $H_{agg}$ of the interference channel 150. The second base station 102 may further use the precoding matrix for downlink transmission, so that the cross-link interference from the second base station 102 is at least partially projected to the right null space of the matrix $H_{agg}$ of the interference channel. The following describes an example of designing a precoding matrix. It should be understood that although the precoding matrix in the example is designed based on the entire channel matrix $H_{agg}$, the design method may be based on portion of the sub-channel matrices (for example, $\sigma_i u_i v_i^H$).

Generally, the interfering signal received by the first base station 101 from the second base station 102 may be expressed as $I_{B2B}=\sqrt{\rho}H_{agg}P_{DL}s$, where $H_{agg}$ is the matrix of the interference channel, PDL is a precoding matrix used for downlink transmission by the second base station 102, s is a symbol vector for carrying information, and ρ is a transmit power of the second base station 102.

Because the interfering signal is related to the precoding matrix used by the second base station 102, the interference to the first base station 101 may be cancelled or reduced through the design of the precoding matrix. The designed precoding matrix is denoted as P, and $P=P_{Null}P_{DL}$, where $P_{DL}$ on the right is used for downlink transmission precoding in a general sense, and $P_{Null}$ on the left is used to cancel interference. In this embodiment of the present disclosure, $P_{Null}=I-H_{agg}^H(H_{agg}H_{agg}^H)^{-1}H_{agg}$ is a projection matrix of the right null space of the matrix $H_{agg}$ of the interference channel. In this case, $H_{agg}P_{Null}=H_{agg}-H_{agg}H_{agg}^H(H_{agg}H_{agg}^H)^{-1}H_{agg}=0$, and the interference to the first base station 101 is $I_{B2B}^{(Precoding)}=\sqrt{\rho}H_{agg}P_{Null}P_{DL}s=0$.

After the projection matrix $P_{Null}$ is designed, it can be considered that the downlink channel matrix $H_{DL}$ and the projection matrix $P_{Null}$ of the second base station 102 form an equivalent downlink channel matrix $\tilde{H}_{DL}$, and $\tilde{H}_{DL}=H_{DL}P_{Null}$. In an embodiment, based on the equivalent downlink channel matrix, any appropriate criterion may be used to design $P_{DL}$. For example, $P_{DL}$ may be designed as $P_{DL}^{(ZF)}=\tilde{H}_{DL}^H(\tilde{H}_{DL}\tilde{H}_{DL}^H)^{-1}$ based on a zero-forcing (ZF) criterion; or $P_{DL}$ may be designed as $P_{DL}^{(MMSE)}=\tilde{H}_{DL}^H(\tilde{H}_{DL}\tilde{H}_{DL}^H+\gamma I)^{-1}$ based on a minimum mean square error (MMSE) criterion, where γ is a normalization factor related to a transmit power and a noise power; or $P_{DL}$ may be designed as $P_{DL}^{(MRC)}=\tilde{H}_{DL}^H$ based on a maximum ratio combining (MRC) criterion. Thus, the design of the precoding matrix $P=P_{Null}P_{DL}$ is completed.

It should be noted that for the equivalent downlink channel matrix $\tilde{H}_{DL}$, based on properties of the projection matrix, $\|\tilde{H}_{DL}\|_F=\|H_{DL}P_{Null}\|_F \leq \|H_{DL}\|_F$. Therefore, after null space projection, a power usage efficiency of the second base station 102 decreases. Correspondingly, loss occurs to a downlink capacity of the cell of the base station 102.

It should be understood that, in a case that uplink reception of two or more neighboring base stations (for example, K base stations such as base stations 101 and 102-1) is interfered with by downlink transmission of the base station 102, the base station 102 may design a precoding matrix for each interfered neighboring base station in the foregoing manner. A final designed precoding matrix may have a plurality of factors, and for example, is expressed as $P=P_{Null}^{(K)} \ldots P_{Null}^{(k)} \ldots P_{Null}^{(1)}P_{DL}$. The rightmost $P_{DL}$ is used for downlink transmission precoding in a general sense; $P_{Null}^{(k)}$ on the left is a projection matrix of a right null space of a matrix of the interference channel of a base station k, and is used to cancel interference to the base station k. In addition, $P_{Null}^{(k)}=I-H_{k,2}^H(H_{k,2}H_{k,2}^H)^{-1}H_{k,2}$, where $H_{k,2}$ is a matrix of the interference channel from the base station 102 to the base station k. In a case that the base station 102 cancels interference to the plurality of neighboring base stations by using the precoding matrix, after null space projection, the power usage efficiency of the base station 102 further decreases, and loss further occurs to the downlink capacity of the cell.

It should be understood that in a case that uplink reception of the base station 101 is interfered with by downlink transmissions of two or more base stations in the base stations 102 and 102-1 to 120-5, each interfering base station may design a precoding matrix in the foregoing manner. There is no mutual influence between the interfering base stations in this process. That is, each interfering base station independently designs $P_{Null}$ based on the matrix $H_{agg}$ of the interference channel from the interfering base station to the base station 101, and then designs $P_{DL}$ based on the equivalent downlink channel matrix. As a result, the interference of each interfering base station to the base station 101 can be cancelled or reduced at the expense of loss of the downlink capacity of the corresponding cell.

As described above, the matrix $H_{agg}$ of the interference channel may be expressed as the sum of the plurality of sub-channel matrices (for example, $\sigma_i u_i v_i^H$). Although the design of the above projection matrix ($P_{Null}=I-H_{agg}^H(H_{agg}H_{agg}^H)^{-1}H_{agg}$) takes into account the entire matrix $H_{agg}$ (all sub-channel matrices) of the interference channel, only portion of the sub-channel matrices may be considered in some embodiments. Correspondingly, the interference from the second base station 102 is partially projected to the right null space of the matrix $H_{agg}$ of the interference channel (specifically, projected to the right null space of portion of the sub-channel matrices). It is advantageous that such partial projection features relatively low complexity, so as to reduce computing load and reduce impact on the downlink capacity of the second base station 102.

Interference Cancellation Through Combining by the First Base Station 101

In this embodiment, the first base station 101 may be configured to design a combining matrix based on one or more of a plurality of sub-channel matrices (for example, $\sigma_i u_i v_i^H$) obtained through division of the channel matrix (for example, $H_{agg}$) of the interference channel 150. The first base station 101 may further use the combining matrix for uplink reception, so that the interference from the second base station 102 is at least partially projected to the left null space of the channel matrix (for example, $H_{agg}$). The following describes an example of designing a combining matrix. It should be understood that although the combining matrix in the example is designed based on the entire channel matrix $H_{agg}$, the design method may be based on portion of the sub-channel matrices (for example, $\sigma_i u_i v_i^H$).

Generally, the interfering signal received by the first base station 101 from the second base station 102 may be expressed as $\tilde{I}_{B2B}=\sqrt{\rho}C_{UL}H_{agg}P_{DL}s$. Likewise $H_{agg}$ is the matrix of the interference channel, $P_{DL}$ is a precoding matrix used for downlink transmission by the second base station 102, s is a symbol vector for carrying information, ρ is a transmit power of the second base station 102, and $C_{UL}$ is a combining matrix for uplink reception by the first base station 101.

Because an interfering signal obtained after combining is related to the combining matrix used by the first base station 101, the interference from the second base station 102 may be cancelled or reduced through the design of the combining matrix. The designed combining matrix is denoted as C, and $C=C_{UL}C_{Null}$, where $C_{Null}$ on the right is used for interference cancellation, and $C_{UL}$ on the left is used for uplink reception combining (for example, signal detection) in a general sense. In this embodiment of the present disclosure, $C_{Null}=I-H_{agg}(H_{agg}^H H_{agg})^{-1}H_{agg}^H$ is a projection matrix of the left null space of the matrix $H_{agg}$ of the interference channel. In this case, $C_{Null}H_{agg}=H_{agg}-H_{agg}(H_{agg}^H H_{agg})^{-1}H_{agg}^H H_{agg}=0$, and the interference detected by the first base station 101 is $I_{B2B}^{(Combining)}=\sqrt{\rho}C_{UL}C_{Null}H_{agg}P_{DL}s=0$.

After the projection matrix $C_{Null}$ is designed, it can be considered that the uplink channel matrix $H_{UL}$ and the projection matrix $C_{Null}$ of the first base station 101 form an equivalent uplink channel matrix $\tilde{H}_{UL}$, and $\tilde{H}_{UL} = C_{Null} H_{UL}$. In this embodiment, based on the equivalent uplink channel matrix, any appropriate criterion may be used to design $C_{UL}$. For example, $C_{UL}$ may be designed as $C_{UL}^{(ZF)} = (\tilde{H}_{UL}^H \tilde{H}_{UL})^{-1} \tilde{H}_{UL}^H$ based on a zero-forcing (ZF) criterion; or $C_{UL}$ may be designed as $C_{UL}^{(MMSE)} = (\tilde{H}_{UL}^H \tilde{H}_{UL} + \gamma I)^{-1} \tilde{H}_{UL}^H$ based on a minimum mean square error (MMSE) criterion, where $\gamma$ is a normalization factor related to a transmit power and a noise power; or $C_{UL}$ may be designed as $C_{UL}^{(MRC)} = \tilde{H}_{UL}^H$ based on a maximum ratio combining (MRC) criterion. Thus, the design of the combining matrix $C = C_{UL} C_{Null}$ is completed.

It should be noted that for the equivalent uplink channel matrix $\tilde{H}_{UL}$, based on properties of the projection matrix, $\|\tilde{H}_{UL}\|_F = \|C_{Null} H_{UL}\|_F \leq \|H_{UL}\|_F$. Therefore, after null space projection, a power usage efficiency of the first base station 101 decreases. Correspondingly, loss occurs to an uplink capacity of the cell of the base station 101.

It should be understood that, in a case that downlink transmission of two or more base stations (for example, K base stations) of the base stations 102 and 102-1 to 120-5 all cause interference to uplink reception of the base station 101, the base station 101 may design a combining matrix for each interfering neighboring base station in the foregoing manner. A final designed combining matrix may have a plurality of factors, and for example, is expressed as $C = C_{UL} C_{Null}^{(1)} \ldots C_{Null}^{(k)} \ldots C_{Null}^{(K)}$. The leftmost $C_{UL}$ is used for uplink reception combining in a general sense; $C_{Null}^{(k)}$ on the right is a projection matrix of a left null space in a matrix of an interference channel of a base station k, and is used to cancel interference from the base station k. In addition, $C_{Null}^{(k)} = I - H_{k,1}(H_{k,1}^H H_{k,1})^{-1} H_{k,1}^H$, where $H_{k,1}$ is a matrix of the interference channel from the base station k to the base station 101. In a case that the base station 101 cancels interference from the plurality of neighboring base stations by using the combining matrix, after null space projection, the power usage efficiency of the base station 101 further decreases, and loss further occurs to the uplink capacity of the cell.

It should be understood that in a case that downlink transmission of the base station 102 causes interference to uplink reception of two or more neighboring base stations (for example, k base stations such as the base stations 101 and 102-1), each interfered base station may design a combining matrix in the foregoing manner. There is no mutual influence between the interfered base stations in this process. That is, each interfered base station independently designs $C_{Null}$ based on the matrix $H_{agg}$ of the interference channel from the base station 102 to the interfered base station, and then designs $C_{UL}$ based on the equivalent uplink channel matrix. As a result, the interference to each interfered base station from the base station 102 can be cancelled or reduced at the expense of loss of the uplink capacity of the corresponding cell.

As described above, the matrix $H_{agg}$ of the interference channel may be expressed as the sum of the plurality of sub-channel matrices (for example, $\sigma_i u_i v_i^H$). Although the design of the above combining matrix ($C_{Null} = I - H_{agg}(H_{agg}^H H_{agg})^{-1} H_{agg}^H$) takes into account the entire matrix $H_{agg}$ (all sub-channel matrices) of the interference channel, only portion of the sub-channel matrices may be considered in some embodiments. Correspondingly, the interference from the second base station 102 is partially projected to the left null space of the matrix $H_{agg}$ of the interference channel (specifically, projected to the left null space of portion of the sub-channel matrices). It is advantageous that such partial projection features relatively low complexity, so as to reduce processing load and reduce impact on the uplink capacity of the first base station 101.

Interference Cancellation Through Cooperation Between the First Base Station 101 and the Second Base Station 102

As described above, either designing a precoding matrix or designing a combining matrix based on the channel matrix $H_{agg}$ of the interference channel 150 or one or more sub-channel matrices obtained through division involves related complex computing and a compromise between interference cancellation and loss of the cell capacity. Therefore, in some embodiments, the first base station 101 and the second base station 102 may cooperate to perform interference cancellation, so as to share the performance loss and computing load between the base stations. For example, the first base station 101 may design the combining matrix based on a first portion (or one or more of the sub-channel matrices) of the plurality of sub-channel matrices obtained through division of the matrix of interference channel; and the second base station 102 may design the precoding matrix based on a second portion (or one or more of the sub-channel matrices) of the plurality of sub-channel matrices obtained through division of the matrix of interference channel. The first portion and the second portion have no intersection, and a union of the first portion and the second portion is a set including the plurality of sub-channel matrices.

For example, after the matrix $H_{agg}$ of the interference channel is decomposed into the sum of the plurality of sub-channel matrices, the matrix of the interference channel may be divided into two parts, that is, $H_{agg} = H_{agg,1} + H_{agg,2}$. In the example of SVD decomposition, $H_{agg,1} = \Sigma_{i \in \mathcal{A}} \sigma_i u_i v_i^H$, and $H_{agg,2} = \Sigma_{i \in \mathcal{B}} \sigma_i u_i v_i^H$. In the example of QR decomposition, $H_{agg,1} = \Sigma_{i \in \mathcal{A}} q_i r_i^H$, $H_{agg,2} = \Sigma_{i \in \mathcal{B}} q_i r_i^H$. In the example of Schur decomposition, $H_{agg,1} = \Sigma_{i \in \mathcal{A}} (\Sigma_{j=1}^L r_{i,j} u_i u_j^H)$, $H_{agg,2} = \Sigma_{i \in \mathcal{B}} (\Sigma_{j=i}^L r_{i,j} u_i u_j^H)$, where $\mathcal{A}$ and $\mathcal{B}$ are the set of sub-channel sequence numbers, satisfying $\mathcal{A} \cap \mathcal{B} = \emptyset$ and $\mathcal{A} \cap \mathcal{B} = \{1, 2, \ldots, L\}$. Thus, the first base station 101 may design the combining matrix based on $H_{agg,1}$ (or at least one sub-channel matrix), and the second base station 102 may design the precoding matrix based on $H_{agg,2}$ (or at least one sub-channel matrix).

For example, when $L=3$, $\mathcal{A} = \{1, 3\}$ and $\mathcal{B} = \{2\}$. Using SVD decomposition as an example, $H_{agg,1} = \sigma_1 u_1 v_1^H + \sigma_3 u_3 v_3^H$, $H_{agg,2} = \sigma_2 u_2 v_2^H$.

As described above, there is no intersection between the first portion of sub-channel matrices and the second portion of the sub-channel matrices respectively for the first base station 101 and the second base station 102, and the union of the first portion of sub-channel matrices and the second portion of the sub-channel matrices includes a collection of all the sub-channel matrices. Therefore, the first base station 101 and the second base station 102 may need to perform selection or negotiation on the first portion and the second portion in a default or explicit manner. In one embodiment, the first base station 101 and/or the second base station 102 may select the first portion or the second portion from the plurality of sub-channel matrices based on system configuration information or in an autonomous manner. In one embodiment, the first base station 101 may select the first portion from the plurality of sub-channel matrices based on an indication from the second base station 102, or the second base station 102 may select the second portion from the plurality of sub-channel matrices based on an indication from the first base station 101.

EXAMPLE 1 OF SUB-CHANNEL MATRIX SELECTION

Figure 5A:
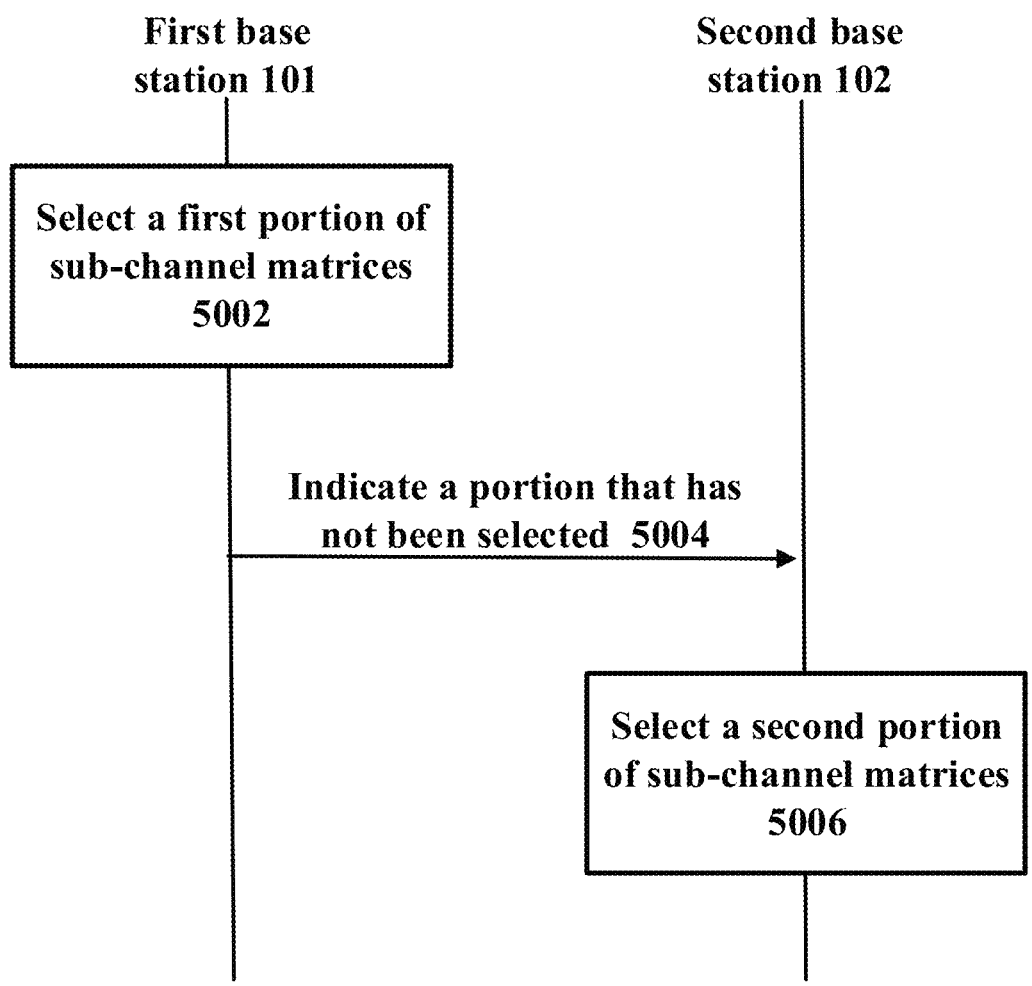
FIG. 5A to FIG. 5C illustrate an example process of sub-channel matrix selection according to an embodiment of the present disclosure.

FIG. 5A illustrates a first example process for sub-channel matrix selection according to an embodiment of the present disclosure. As shown in FIG. 5A, in 5002, a first base station 101 may select a first portion from a plurality of sub-channel matrices based on system configuration information or in an autonomous manner, and in 5004, notifies a second base station 102 of a remaining portion that has not been selected. In 5006, the second base station 102 may consider the remaining portion that has not been selected as a second portion, or may select a second portion from the remaining portion based on system configuration information or in an autonomous manner.

Figure 5B:
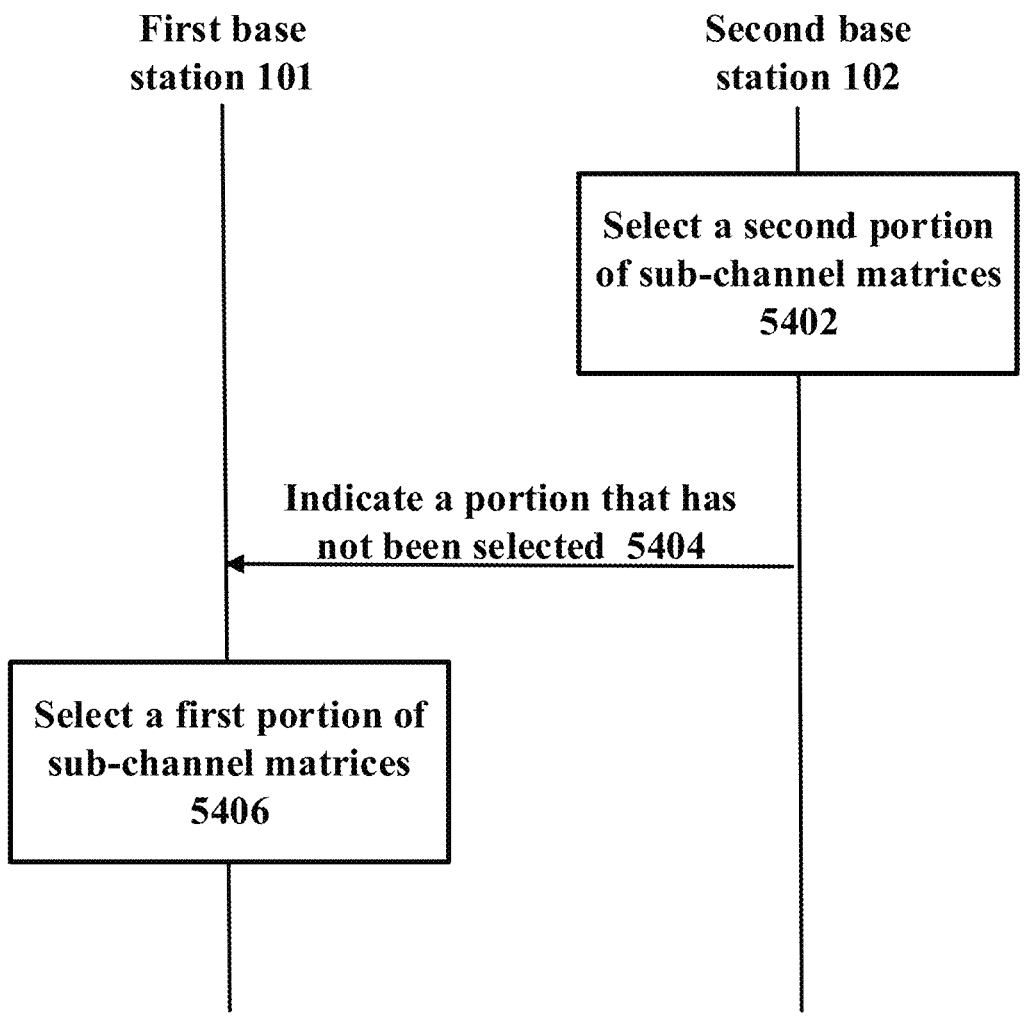

FIG. 5B illustrates a second example process for sub-channel matrix selection according to an embodiment of the present disclosure. This example can be similarly understood with reference to FIG. 5A. In some cases, the first base station 101 may provide the processed channel information to the second base station 102 (for example, refer to FIG. 4A), or the second base station 102 may process the obtained channel information (for example, refer to FIG. 4B and FIG. 4C). Correspondingly, the second base station 102 may first select, in 5402, the second portion of the sub-channel matrices, and in 5404, notifies the first base station 101 of the remaining portion that has not been selected. In 5406, the first base station 101 may similarly consider the remaining portion that has not been selected as the second portion, or select the second portion from the remaining portion based on system configuration information or in an autonomous manner.

Figure 5C:
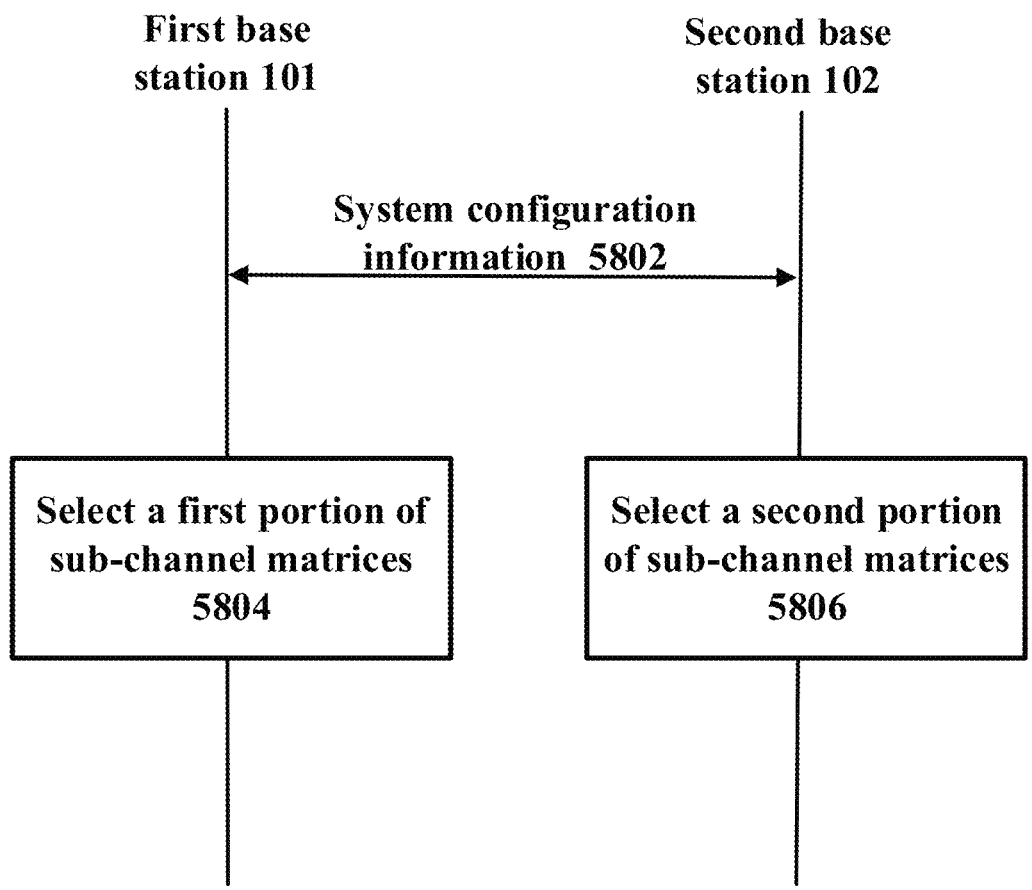

FIG. 5C illustrates a third example process for sub-channel matrix selection according to an embodiment of the present disclosure. As shown in FIG. 5C, in 5802, the first base station 101 and the second base station 102 may perform negotiation on system configuration information. The system configuration information may specify a maximum quantity of selectable sub-channel matrices and characteristics of the sub-channel matrices. Generally, the maximum quantity of sub-channel matrices (that is, the size of the first portion or the second portion) is positively correlated with a processing capability of each base station. The characteristics of the sub-channel matrices include, for example, the value of the F norm of the matrix. The value of the F-norm is generally positively correlated with contribution of a corresponding sub-channel matrix to interference, as described in detail below. In an embodiment, system configuration information obtained through negotiation may specify two sub-channel matrices with a smaller F-norm for selection by the first base station 101, and specify three sub-channel matrices with a larger F-norm for selection by the second base station 102.

It should be understood that, after selecting a corresponding portion of sub-channel matrices, the first base station 101 or the second base station 102 may use one or more of the corresponding portion of sub-channel matrices to design a combining matrix or a precoding matrix. The number of sub-channel matrices used can be dynamically determined by the first base station 101 or the second base station 102 based on its own computing load, an interference status, and other factors.

EXAMPLE 2 OF SUB-CHANNEL SELECTION

Figure 6:
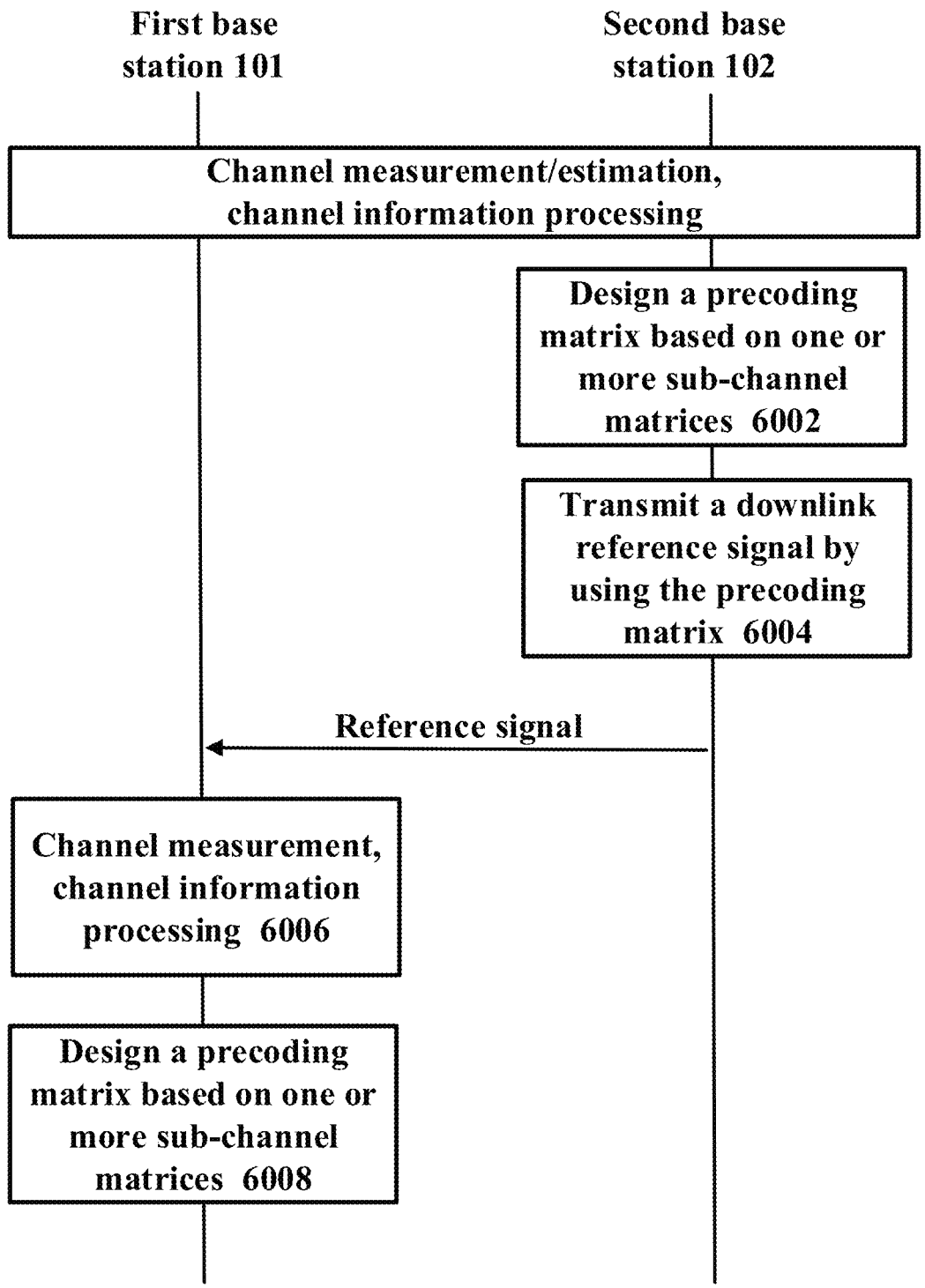
FIG. 6 illustrate an example process of sub-channel matrix selection according to an embodiment of the present disclosure.

The example processes for sub-channel matrix selection are described above with reference to FIGS. 5A to 5C. FIG. 6 illustrates a further example process for sub-channel matrix selection according to an embodiment of the present disclosure, where the process may implicitly assist in sub-channel matrix selection.

As shown in FIG. 6, channel information of an interference channel is first obtained through channel measurement or estimation, and the channel information is properly processed. As described with reference to FIGS. 4A to 4C, the channel information may be obtained and processed by a first base station 101; or the channel information may be obtained by the first base station 101 and the channel information may be processed by the second base station 102; or the channel information is obtained and processed by the second base station 102. In any one of the manners, a plurality of sub-channel matrices generated by processing the channel information may be obtained by the second base station 102. Next, in 6002, the second base station 102 may design a precoding matrix based on one or more of the plurality of sub-channel matrices. In 6004, the second base station 102 may use the precoding matrix to perform additional transmission of a downlink reference signal (compared to previous transmission).

It should be understood that the additional transmission of the downlink reference signal herein is different from transmission of the downlink reference signal by the second base station 102 before 6002. Compared with the previous transmission, the precoding matrix is used for the additional transmission herein. Therefore, through measurement on the additionally transmitted reference signal, an equivalent channel matrix obtained by the first base station 101 is an interference channel obtained through correction based on the precoding matrix. The first base station 101 may process the equivalent channel matrix and design a combining matrix based on generated sub-channel matrices. Specifically, in 6006, the first base station 101 may obtain measurement information by using the downlink reference signal additionally transmitted by the second base station 102, and obtain the equivalent channel matrix based on the measurement information. The first base station 101 may decompose the equivalent channel matrix, to divide the equivalent channel matrix into a sum of the plurality of sub-channel matrices. In 6008, the first base station 101 may design the combining matrix based on one or more of the plurality of sub-channel matrices, and use the combining matrix for uplink reception, so that the interference caused by the second base station 102 is at least partially projected to a left null space of the equivalent channel matrix.

In the example of FIG. 6, the second base station 102 and the first base station 101 perform transmission precoding and reception combining based on the interference channel and the equivalent interference channel, respectively. The second base station 102 uses the precoding matrix to transmit the downlink reference signal, so that the first base station 101 may indirectly learn an interference cancellation status of the second base station 102. In this way, no explicit signalling is required for coordinating sub-channel matrix selection between the base stations, thereby reducing signalling overheads.

EXAMPLE MANNER OF SELECTING SUB-CHANNEL MATRICES

As described above, either designing a precoding matrix or designing a combining matrix based on the channel matrix $H_{agg}$ of the interference channel 150 or one or more sub-channel matrices obtained through division involves related complex computing and a compromise between interference cancellation and loss of the cell capacity. Therefore, in some embodiments, the precoding matrix or the combining matrix may be designed based on as few sub-channel matrices as possible. For example, only main part of the interference can be cancelled, so as to simplify computing while reducing capacity loss caused by null-space projection, and achieving a compromise between interference cancellation, complexity, and the capacity.

In one embodiment, the first base station 101 or the second base station 102 may be configured to solve an F-norm for each of the plurality of sub-channel matrices obtained through division of the interference channel and design the combining matrix or the precoding matrix based on one or more sub-channel matrices with a larger F-norm. Because a value of an F-norm of a specific sub-channel matrix is positively correlated with the interference caused by the sub-channel matrix to the first base station 101, the one or more sub-channel matrices with a larger F-norm contribute more to interference on the first base station 101.

Using the case of obtaining the sub-channel matrices through SVD decomposition as an example, the first base station 101 or the second base station 102 may solve a singular value for each of the plurality of sub-channel matrices obtained through division of the interference channel, and designs the combining matrix or precoding matrix based on one or more sub-channel matrices with a larger singular value. In SVD decomposition, the interference channel may be expressed as $H_{agg} = \sigma_1 u_1 v_1^H + \ldots \sigma_L u_L v_L^H$. Assuming $\sigma_1 \geq \sigma_2 \ldots \sigma_L$, $H_m = \sigma_m u_m v_m^H$ is used to represent the m-th sub-channel matrix of the interference channel. For SVD decomposition, $\|H_m\|_F^2 = tr(\sigma_m^2 u_m v_m u_m^H) = \sigma_m^2$. It can be seen that a larger singular value of the sub-channel matrix indicates a greater contribution to the interference on the first base station 101. When the spatial characteristics of the interference channel are relatively obvious, it can be considered that the singular value of the sub-channel matrix can reflect a strength of the signal transmission path, that is, a larger F-norm (or a singular value as a special case in SVD decomposition) corresponds to a path (such as a LOS path) with a larger channel gain.

It should be understood that, although contribution of each sub-channel matrix to interference may vary with the value of the F-norm, when null-space projection is performed by using the combining matrix or the precoding matrix, impact of each sub-channel matrix on the capacity is statistically equivalent, and related computing complexity is also basically equivalent. Therefore, designing the combining matrix or the precoding matrix based on the sub-channel matrices with a larger F-norm can reduce the capacity loss and decrease the computing complexity while significantly reducing interference.

Maintaining Information Related to Interference Cancellation

In this embodiment of the present disclosure, the first base station 101 and the second base station 102 may need to store the channel information (such as the channel matrix) and the processed channel information (such as the channel sub-matrices obtained through division) locally or remotely. Because relative locations between the base stations are substantially fixed, and the interference channel may have slowly time-varying characteristics, the channel information and the processed channel information may be valid for a relatively long period of time. The first base station 101 and the second base station 102 may periodically monitor the interference channel and update the stored information when necessary.

Figure 7:
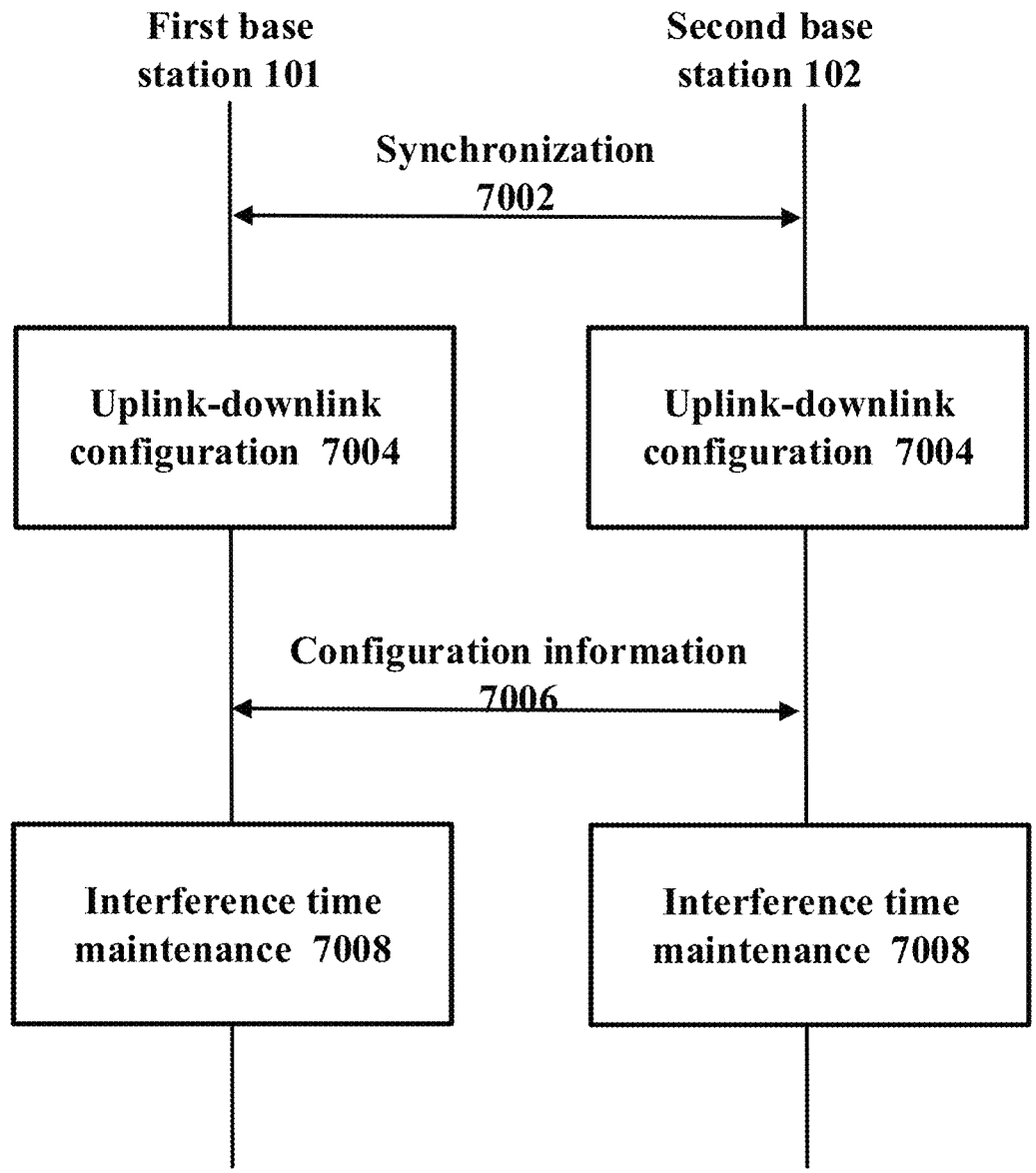
FIG. 7 illustrate an example process of maintaining interference time information according to an embodiment of the present disclosure.

In this embodiment of the present disclosure, the first base station 101 and the second base station 102 may need to store inter-base station interference time information locally or remotely. As described with reference to Table 1 in FIG. 2, cross-link interference between neighboring base stations occurs only when uplink and downlink transmissions are reverse between the neighboring base stations. In other words, in a system using flexible duplex, there is a specific transmission moment at which downlink transmission of the second base station 102 causes interference to uplink reception of the first base station 101. FIG. 7 illustrates an example process for maintaining interference time information according to an embodiment of the present disclosure.

In the example of FIG. 7, in 7002, the first base station 101 and the second base station 102 monitor synchronization signals transmitted by each other, so as to perform synchronization. In 7004, the first base station 101 and the second base station 102 each may perform uplink-downlink configuration, including uplink-downlink time allocation. In 7006, the first base station 101 and the second base station 102 may provide their own uplink-downlink time configuration information to each other (for example, through an X2 interface or a wireless link). In 7008, the first base station 101 and the second base station 102 may determine, based on the uplink-downlink configuration information, one or more times at which the first base station 101 performs uplink reception and the second base station 102 performs downlink transmission, where the one or more times include a specific moment at which the second base station 102 causes cross-link interference to the first base station 101. The first base station 101 and the second base station 102 may also determine, based on the uplink-downlink configuration information, one or more times at which the second base station 102 performs uplink reception and the first base station 101 performs downlink transmission, where the one or more times include a specific moment at which the first base station 101 causes cross-link interference to the second base station 102.

Based on the above determining, the first base station 101 and/or the second base station 102 may use the combining matrix or the precoding matrix for interference cancellation only at the one or more times. It should be understood that the interference cancellation method in the present disclosure can be used at all times; however, considering the possible capacity loss and complex computing, using the interference cancellation method only during the interference time can help maintain lower capacity loss and computing complexity.

The following describes examples of interference time information with reference to Table 2 and Table 3 in FIG. 8. In this embodiment, a possible time of occurrence of cross-link interference may be determined based on whether uplink and downlink transmissions are reverse between the first base station 101 and neighboring base stations. If the uplink and downlink transmissions are reverse, such interference time exists. Further, based on whether uplink reception or downlink transmission is performed during the interference time, each base station may determine whether the base station itself is an interfered party or an interfering party. Each base station may maintain the interference time information locally according to the above principles.

Table 2 is an interference time information table maintained by the first base station 101 based on the example of uplink-downlink time configuration in Table 1. As shown in Table 2, referring to Table 1, each base station is configured to perform downlink transmission during the T and 2T periods, and each base station is configured to perform uplink reception during the 7T period. Therefore, no cross-link interference occurs during the corresponding periods. During the periods of 3T to 4T, uplink and downlink transmissions are reverse between the base station 101 and the base stations 102 or 102-5; therefore, cross-link interference occurs, and the base station 101 performing uplink reception becomes the interfered party. During the periods of 5T to 6T, uplink and downlink transmissions are reverse between the base station 101 and only the base station 102; therefore, cross-link interference also occurs, and the base station 101 performing uplink reception becomes the interfered party.

Table 3 is an interference time information table maintained by the second base station 102 based on the example of uplink-downlink time configuration in Table 1. Table 3 can be similarly understood with reference to Table 2 and details are not repeated herein. In this embodiment, the interference time information may be updated periodically or based on a trigger event (for example, uplink-downlink configurations of one or more neighboring base stations change).

EXEMPLARY METHODS

FIG. 9A illustrates an example method for communication according to an embodiment of the present disclosure. This method can be executed by a first base station 101 or an electronic device 300 in a system 100. As shown in FIG. 9A, the method 900 may include: obtaining channel information of a channel from the second base station 102 to the first base station 101 (block 905), and processing the channel information to divide the channel (block 910). Then, the first base station 101 may provide at least portion of the processed channel information to the second base station 102. The method 900 may further include: cancelling the interference from downlink transmission of the second base station to uplink reception of the first base station based on the at least portion of the processed channel information (block 915). For a detailed example operation of this method, reference may be made to the above description of the operation of the first base station 101 or the electronic device 300, and details are not repeated herein.

FIG. 9B illustrates another example method for communication according to an embodiment of the present disclosure. This method can be executed by a second base station 102 or an electronic device 350 in a system 100. As shown in FIG. 9B, the method 940 may include receiving at least portion of processed channel information from a first base station (block 945). The method 940 may further include cancelling interference from downlink transmission of the second base station 102 to uplink reception of the first base station 101 based on the at least portion of the processed channel information (block 950). For a detailed example operation of this method, reference may be made to the above description of the operation of the second base station 102 or the electronic device 350, and details are not repeated herein.

Figure 9C:
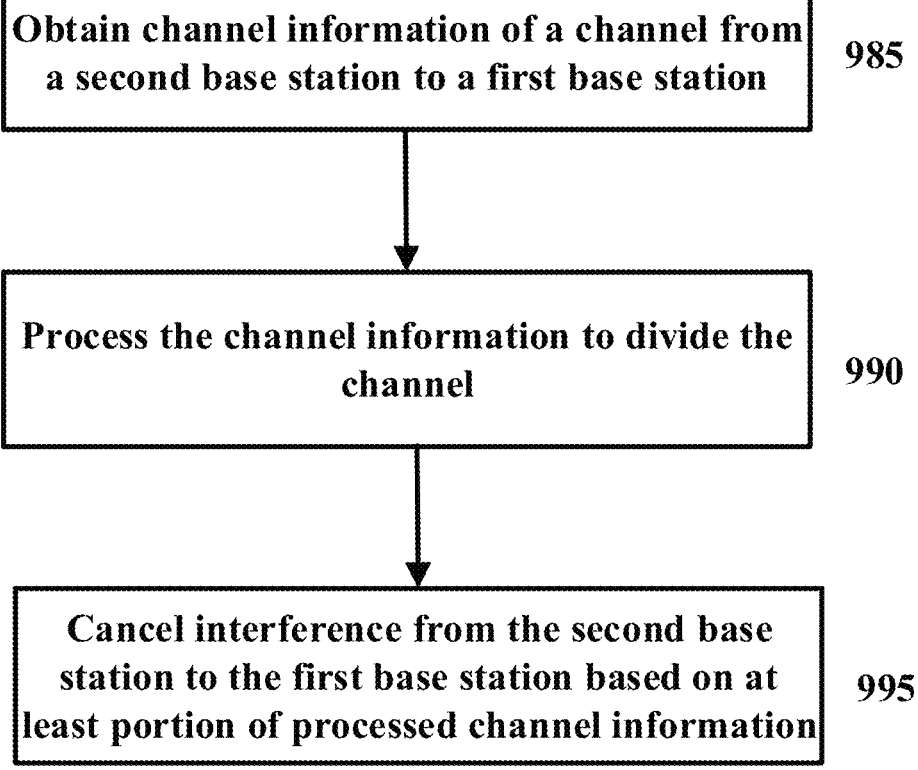

FIG. 9C illustrates yet another example method for communication according to an embodiment of the present disclosure. This method can be executed by a second base station 102 or an electronic device 350 in a system 100. As shown in FIG. 9C, the method 980 may include: obtaining channel information of a channel from the second base station 102 to a first base station 101 (block 985), and processing the channel information to divide the channel (block 990). Then, the second base station 102 may provide at least portion of the processed channel information to the first base station 101. The method 980 may further include cancelling the interference from downlink transmission of the second base station to uplink reception of the first base station based on the at least portion of the processed channel information (block 995). For a detailed example operation of this method, reference may be made to the above description of the operation of the base station 102 or the electronic device 350, and details are not repeated herein.

Various exemplary electronic devices and methods according to the embodiments of the present disclosure have been described above. It should be understood that the operations or functions of these electronic devices may be combined with each other to achieve more or less operations or functions than described. The operation steps of the methods can also be combined with each other in any suitable order, so that more or fewer operations are similarly achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can include, but is not limited to, a floppy disk, an optical disk, a magneto-optical disk, a memory card, a memory stick, and the like. In addition, it should be understood that the above series of processing and devices may alternatively be implemented by software and/or firmware.

The technology of the present disclosure can be applied to various products. For example, the base stations mentioned in this disclosure can be implemented as any type of evolved Node B (gNB), such as a macro gNB and a small gNB. The small gNB can be a gNB covering a cell smaller than the macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as user equipment in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user equipment may also be implemented as a terminal that performs machine-to-machine (M2M) communication (also referred to as a machine type communication (MTC) terminal). Further, the user equipment may be a radio communication module (such as an integrated circuit module including a single wafer) installed on each of the above terminals.

Use cases according to the present disclosure will be described below with reference to FIGS. 10 to 11.

First Use Case

Figure 10:
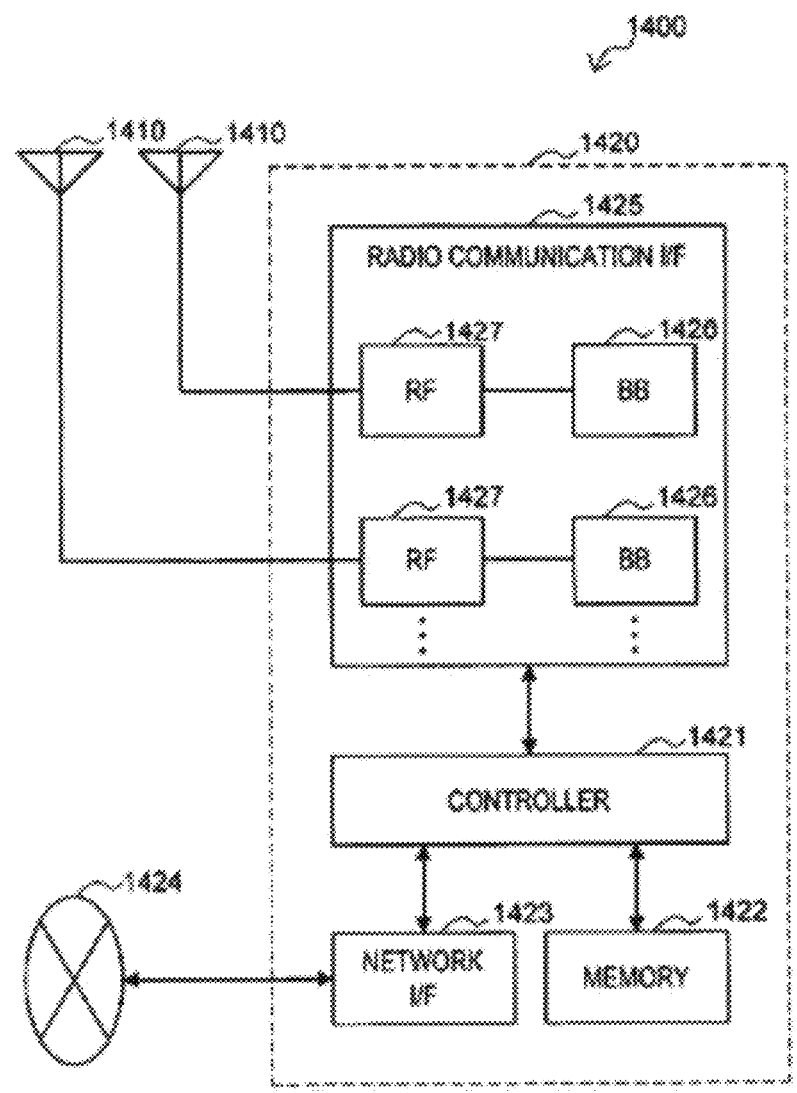
FIG. 10 is a block diagram illustrating a first example of a schematic configuration of a gNB to which the technology of the present disclosure can be applied.

FIG. 10 is a block diagram illustrating a first example of a schematic configuration of a gNB to which the technology in content of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 10, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via the network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes a RAM and a ROM, and stores a program that is executed by the controller 1421 and various types of control data (such as a terminal list, transmission power data, and scheduling data).

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface (such as an S1 interface and an X2 interface). The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes (such as Long Term Evolution (LTE) and LTE-Advanced), and provides, via the antenna 1410, radio connection to a terminal located in a cell of the gNB 1400. The radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)), Instead of the controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. In addition, the RF circuit 1427 may include, for example, a mixer, a filter, and an amplifier, and transmits and receives radio signals via the antenna 1410. Although FIG. 10 illustrates an example in which one RF circuit 1427 is connected to one antenna 1410, the present disclosure is not limited to thereto; rather, one RF circuit 1427 may be connected to a plurality of antennas 1410 at the same time.

As illustrated in FIG. 10, the radio communication interface 1425 may include the multiple BB processors 1426. For example, the multiple BB processors 1426 may be compatible with multiple frequency bands used by the gNB 1400. As illustrated in FIG. 10, the radio communication interface 1425 may include the multiple RF circuits 1427. For example, the multiple RF circuits 1427 may be compatible with multiple antenna elements. Although FIG. 10 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 11:
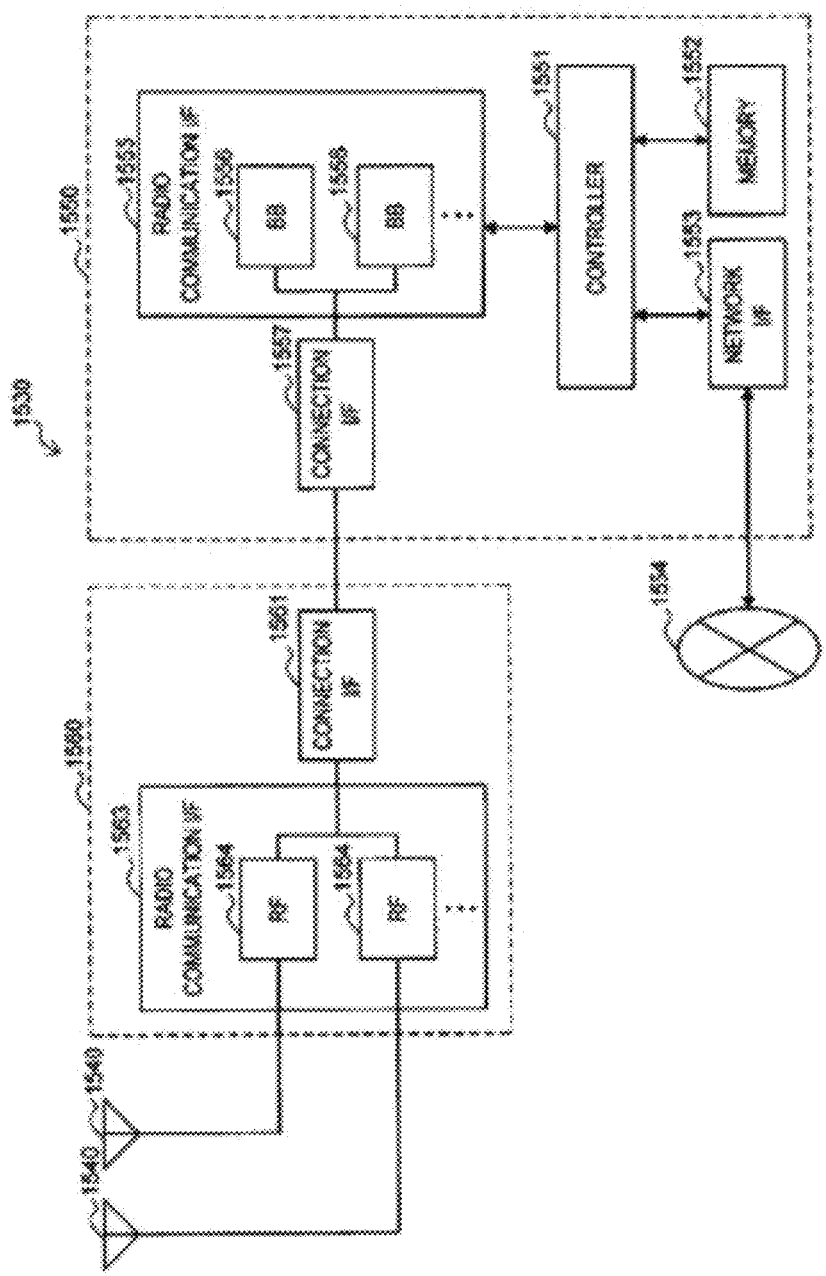
FIG. 11 is a block diagram illustrating a second example of a schematic configuration of a gNB to which the technology of the present disclosure can be applied

FIG. 11 is a block diagram illustrating a second example of a schematic configuration of a gNB to which the technology in content of the present disclosure can be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements (such as multiple antenna elements included in a MIMO antenna) and is used for the RRH 1560 to transmit and receive radio signals. As shown in FIG. 11, the gNB 1530 may include multiple antennas 1540. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 10.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 10, except that the BB processor 1556 is connected to the RF circuit 1564 of the RRH 1560 via the connection interface 1557. As illustrated in FIG. 11, the radio communication interface 1555 may include the multiple BB processors 1556. For example, the multiple BB processors 1556 may be compatible with multiple frequency bands used by the gNB 1530. Although FIG. 11 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. The radio communication interface 1563 may typically include, for example, the RF circuitry 1564. The RF circuit 1564 may include, for example, a mixer, a filter, and an amplifier, and transmits and receives radio signals via the antenna 1540. Although FIG. 11 illustrates the example in which one RF circuit 1564 is connected to one antenna 1540, the present disclosure is not limited to thereto; rather, one RF circuit 1564 may be connected to a plurality of antennas 1540 at the same time.

As illustrated in FIG. 11, the radio communication interface 1563 may include the multiple RF circuits 1564. For example, the multiple RF circuits 1564 may support multiple antenna elements. Although FIG. 11 illustrates the example in which the radio communication interface 1563 includes the multiple RF circuits 1564, the radio communication interface 1563 may also include a single RF circuit 1564.

FIG. 12A to FIG. 12E illustrate performance simulation diagrams related to an embodiment of the present disclosure. The interference cancellation performance based on precoding, combination, and a combination of the two is simulated based on the following configuration by using the topology in FIG. 1.

| Parameter | Value |
| --- | --- |
| Carrier frequency | 4.9 GHz |
| Cell radius | 500 m |
| Antenna height of the base station | 20 m |
| Number of active users in the cell | 5 |
| Antenna scale for the base station | 4 × 4 uniformly-spaced planar arrays |
| Height of antenna for the user | 1.5 m |

FIGS. 12A to 12E illustrate cell throughputs corresponding to different levels of interference cancellation schemes. "Normal" means that no interference cancellation scheme is used; "completely null projection" means that interference is completely cancelled based on all sub-channel matrices; "first-level null projection" means that interference is partially cancelled based on one sub-channel matrix with the largest F norm; "second-level null projection" means that interference is partially cancelled based on two sub-channel matrices with top-ranking F-norms, and "third-level null projection" means that interference is partially cancelled based on three sub-channel matrices with top-ranking F-norms.

Figure 12A:
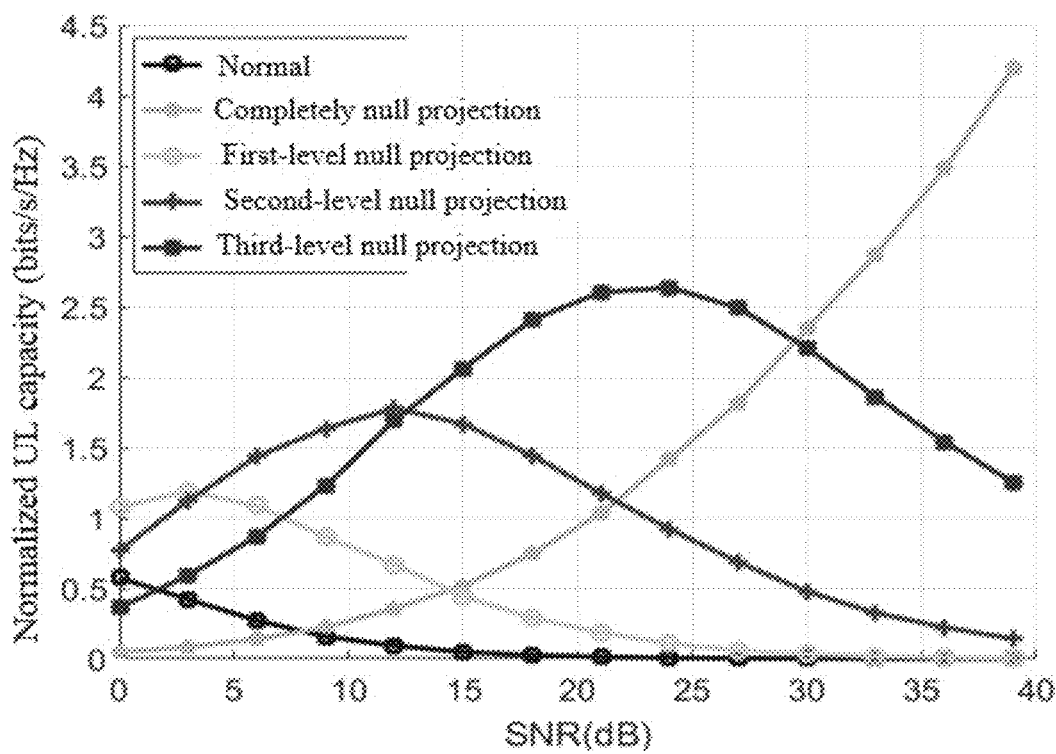
FIG. 12A to FIG. 12E illustrate performance simulation diagrams related to an embodiment of the present disclosure.

FIG. 12A shows performance of an interfered party in a case that the interference cancellation method based on combining is used. There are one interfered party and two interfering parties. It can be seen that this method can effectively suppress cross-link interference and improve an uplink cell throughput for the interfered party. In addition, as the sub-channel matrices increase, the cross-link interference is cancelled more significantly at the expense of using more power for the combining operation by the interfered party, resulting in lower power usage efficiency. Therefore, combining performed based on more sub-channel matrices in case of a higher signal-to-noise ratio has a better effect, and combining performed based on fewer sub-channel matrices in case of a lower signal-to-noise ratio can make more efficient use of base station power. In an actual system, the number of sub-channel matrices may be adjusted based on specific statuses and requirements, so as to implement a compromise between interference and throughput performance.

Figure 12B:
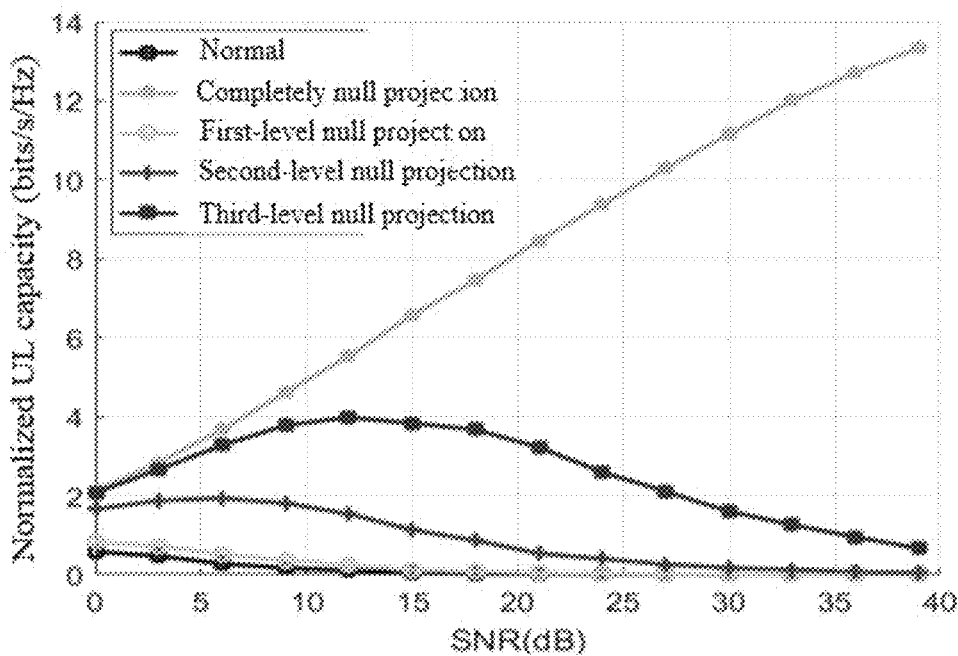
Figure 12C:
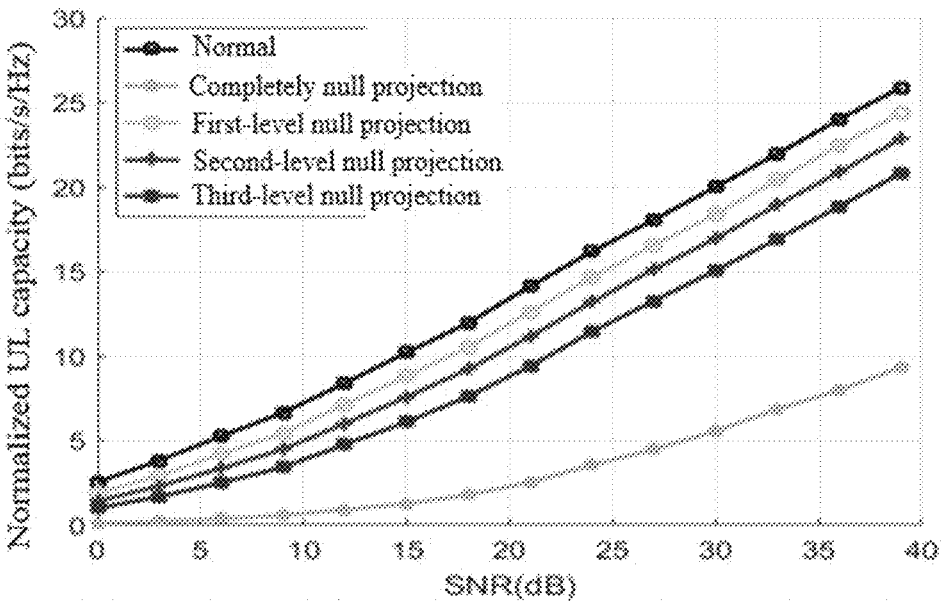

FIGS. 12B and 12C illustrate performance of an interfered party and an interfering party in a case that the interference cancellation method based on precoding is used. There are one interfered party and two interfering parties in this simulation. It can be seen that this method can effectively suppress cross-link interference and improve an uplink throughput of the cell that receives interference. In addition, this method imposes impact on a downlink throughput of the interfering party, and as the sub-channel matrices increase, there is more loss of throughput. This is because more power of the interfering party is used for null-space projection in precoding when the interfering party cancels interference based on more sub-channel matrices, so as to reduce precoding power used for downlink transmission and further reduce downlink transmission performance. In an actual system, the number of sub-channel matrices may be adjusted based on specific statuses and requirements, so as to implement a compromise between interference and throughput performance.

Figure 12D:
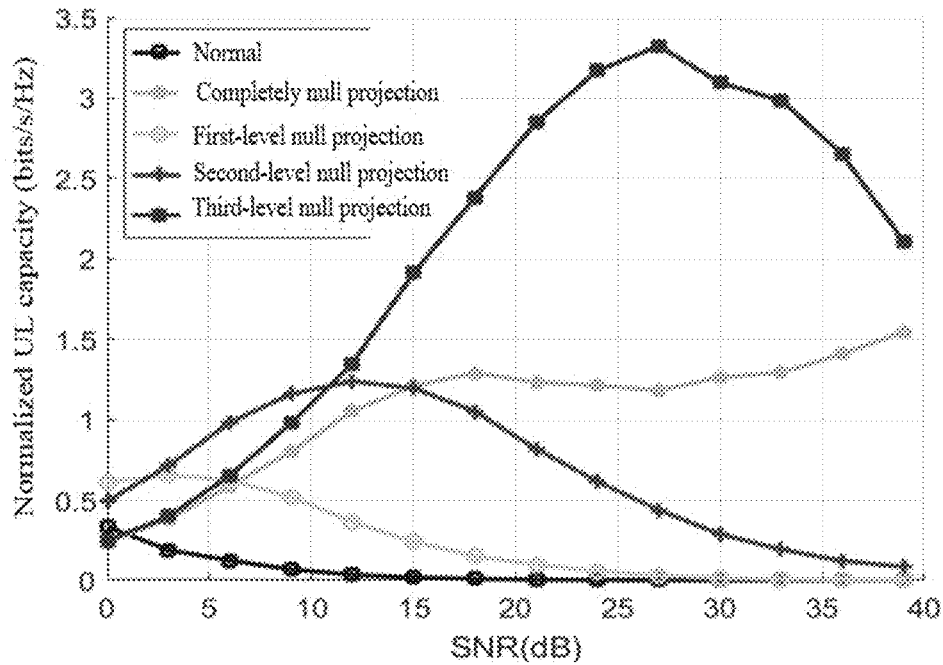
Figure 12E:
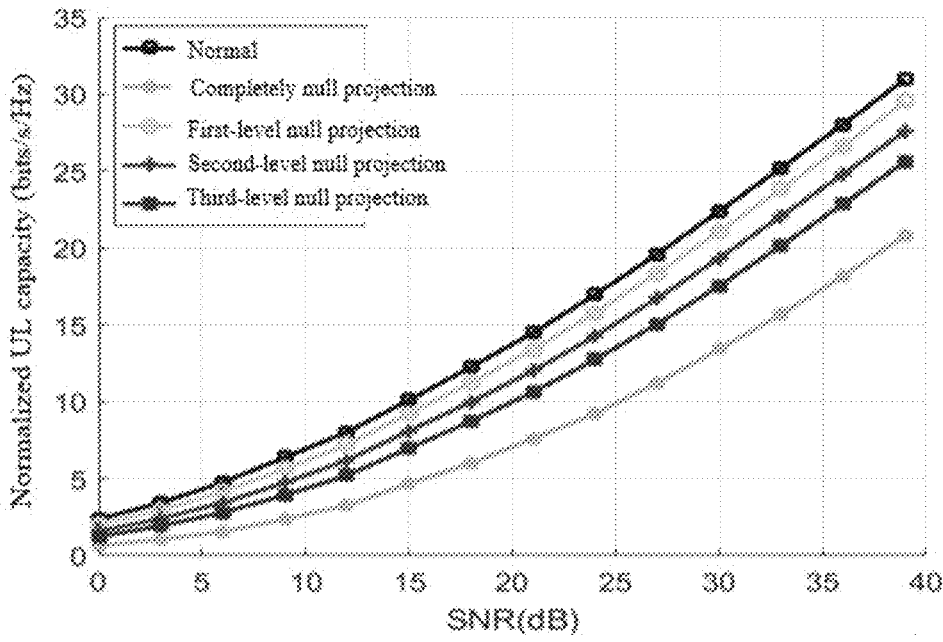

FIGS. 12D and 12E illustrate performance of an interfered party and an interfering party in a case that the interference cancellation method based on a combination of precoding and combining is used. There are one interfered party and three interfering parties in this simulation. It can be seen that this method can effectively suppress cross-link interference and improve an uplink throughput of the cell that receives interference. In addition, this method imposes impact on a downlink throughput of the interfering party, and as the sub-channel matrices increase, there is more loss of throughput. Compared with FIG. 12A, the cell throughput of the interfered party is improved. Compared with FIGS. 12B and 12C, the cell throughput of the interfering party is also improved. This is because the interfering party and the interfered party each perform partial interference cancellation, and such load imposes slight impact on respective cells. In an actual system, the number of sub-channel matrices may be adjusted based on specific statuses and requirements, so as to implement a compromise between interference and throughput performance.

The solutions of the present disclosure may be implemented in the following example manners:

Clause 1. An electronic device for a first base station, including a processing circuit, where the processing circuit is configured to:

obtain channel information of a channel from a second base station to the first base station;
process the channel information to divide the channel; and
provide at least portion of the processed channel information to the second base station;
where at least one of the first base station or the second base station cancels, based on the at least portion of the processed channel information, interference caused from downlink transmission of the second base station to uplink reception of the first base station.

Clause 2. The electronic device of clause 1, where the processing circuit is configured to obtain the channel information by:
obtaining the channel information by measuring a downlink reference signal of the second base station; and/or
estimating the channel information based at least on location information between the first base station and the second base station.

Clause 3. The electronic device of clause 1, where the processing the channel information includes:
obtaining a first channel matrix based on the channel information; and
decomposing the first channel matrix, such that the first channel matrix is divided into a sum of a plurality of sub-channel matrices.

Clause 4. The electronic device of clause 3, where the providing the at least portion of the processed channel information to the second base station includes:
providing, to the second base station, at least portion of the plurality of sub-channel matrices obtained through division of the first channel matrix, where the providing is performed through at least one of a wireless link or a wired interface between the first base station and the second base station.

Clause 5. The electronic device of clause 4, where the processing circuit is configured to cancel the interference by:
designing a combining matrix based on one or more sub-channel matrices in a first portion of the plurality of sub-channel matrices obtained through division of the first channel matrix; and
performing uplink reception using the combining matrix, such that the interference is at least partially projected to a left null space of the first channel matrix.

Clause 6. The electronic device of clause 5, where the at least portion of the plurality of sub-channel matrices provided to the second base station includes all of the plurality of sub-channel matrices, or a remainder of the plurality of sub-channel matrices except for the first portion.

Clause 7. The electronic device of clause 5, where the processing circuit is configured to determine the first portion of the plurality of sub-channel matrices by:
selecting the first portion from the plurality of sub-channel matrices based on system configuration information;
autonomously selecting the first portion from the plurality of sub-channel matrices; and/or
selecting the first portion from the plurality of sub-channel matrices based on an indication from the second base station.

Clause 8. The electronic device of clause 4, where the processing circuit is further configured to:
obtain measurement information through at least one additional transmission of the downlink reference signal of the second base station;
obtain a second channel matrix based on the measurement information; and
decompose the second channel matrix, such that the second channel matrix is divided into a sum of a second plurality of sub-channel matrices;
where the additional transmission of the downlink reference signal of the second base station includes:
designing a precoding matrix based on one or more sub-channel matrices of the plurality of sub-channel matrices; and
using the precoding matrix to perform the additional transmission of the downlink reference signal, and
where the processing circuit is configured to cancel the interference by:
designing a combining matrix based on one or more sub-channel matrices of the second plurality of sub-channel matrices;
performing uplink reception using the combining matrix, such that the interference is at least partially projected to a left null space of the first channel matrix.

Clause 9. The electronic device of clause 5 or clause 8, where the processing circuit is further configured to solve an F-norm for each of the plurality of sub-channel matrices or of the second plurality of sub-channel matrices, and the one or more sub-channel matrices of the plurality of sub-channel matrices or of the second plurality of sub-channel matrices are sub-channel matrices having a larger F norm.

Clause 10. The electronic device of clause 9, where the processing circuit is configured to decompose the first channel matrix or the second channel matrix using SVD decomposition, the one or more sub-channel matrices of the plurality of sub-channel matrices or of the second plurality of sub-channel matrices are sub-channel matrices having a larger singular value.

Clause 11. The electronic device of clause 3, where the processing circuit is further configured to:
based on uplink-downlink configuration information of the first base station and the second base station, determine one or more times for uplink reception by the first base station and for downlink transmission by the second base station, where the one or more times include a specific time point of causing the interference; and
cancel interference at the one or more times.

Clause 12. A second electronic device for a second base station, where the second base station is configured to operate with the electronic device for the first base station according to any one of clauses 1 to 11, the second electronic device includes a second processing circuit, and the second processing circuit is configured to:
receive at least portion of processed channel information from a first base station; and
cancel, based on the at least portion of the processed channel information, interference caused from downlink transmission of the second base station to uplink reception of the first base station.

Clause 13. The second electronic device of clause 12, where the second processing circuit is further configured to:
receive, from the first base station, at least a portion of a plurality of sub-channel matrices obtained through division of a first channel matrix, where the receiving is performed through at least one of a wireless link or a wired interface between the first base station and the second base station.

Clause 14. The second electronic device of clause 13, where the second processing circuit is configured to cancel the interference by:
  designing a precoding matrix based on one or more sub-channel matrices in a second portion of the plurality of sub-channel matrices obtained through division of the first channel matrix; and
  performing downlink transmission using the precoding matrix, such that the interference is at least partially projected to a right null space of the first channel matrix;
  where the first portion and the second portion have no intersection, and a union of the first portion and the second portion is a set including the plurality of sub-channel matrices.

Clause 15. The second electronic device of clause 14, where the at least portion of the plurality of sub-channel matrices received from the first base station includes all or the second portion of the plurality of sub-channel matrices.

Clause 16. The second electronic device of clause 14, where the second processing circuit is configured to determine the second portion of the plurality of sub-channel matrices by:
  selecting the second portion from the plurality of sub-channel matrices based on system configuration information;
  autonomously selecting the second portion from the plurality of sub-channel matrices; and/or
  selecting the second portion from the plurality of sub-channel matrices based on an indication from the first base station.

Clause 17. The second electronic device of clause 13, where the second processing circuit is further configured to:
  design a precoding matrix based on one or more sub-channel matrices of the plurality of sub-channel matrices; and
  use the precoding matrix to perform the additional transmission of the downlink reference signal.

Clause 18. The second electronic device of clause 14 or clause 17, where the second processing circuit is further configured to solve an F-norm for each of the plurality of sub-channel matrices; and
  the one or more sub-channel matrices of the plurality of sub-channel matrices are sub-channel matrices having a larger F norm.

Clause 19. The second electronic device of clause 18, where the second processing circuit is configured to decompose the first channel matrix using SVD decomposition, and the one or more sub-channel matrices of the plurality of sub-channel matrices are sub-channel matrices having a larger singular value.

Clause 20. The second electronic device of clause 12, where the second processing circuit is further configured to:
  based on uplink-downlink configuration information of the first base station and the second base station, determine one or more times for uplink reception by the first base station and for downlink transmission by the second base station, where the one or more times include a specific time point of causing the interference; and
  cancel interference at the one or more times.

Clause 21. An electronic device for a second base station, including a processing circuit, where the processing circuit is configured to:
  obtain channel information of a channel from the second base station to a first base station;
  process the channel information to divide the channel; and
  provide at least portion of processed channel information to the first base station;
  where at least one of the first base station or the second base station cancels, based on at least portion of the processed channel information, interference caused from downlink transmission of the second base station to uplink reception of the first base station.

Clause 22. The electronic device of clause 21, where the processing circuit is configured to obtain the channel information by:
  transmitting a downlink reference signal, and receiving the channel information obtained through measurement by the first base station; and/or
  estimating the channel information based at least on location information between the first base station and the second base station.

Clause 23. The electronic device of clause 21, where the processing the channel information includes:
  obtaining a first channel matrix based on the channel information; and
  decomposing the first channel matrix, such that the first channel matrix is divided into a sum of a plurality of sub-channel matrices.

Clause 24. The electronic device of clause 23, where the providing the at least portion of processed channel information to the first base station includes:
  providing, to the first base station, at least portion of the plurality of sub-channel matrices obtained through division of the first channel matrix, where the providing is performed through at least one of a wireless link or a wired interface between the first base station and the second base station.

Clause 25. The electronic device of clause 24, where the processing circuit is configured to cancel the interference by:
  designing a precoding matrix based on one or more sub-channel matrices in a first portion of the plurality of sub-channel matrices obtained through division of the first channel matrix; and
  performing downlink transmission using the precoding matrix, such that the interference is at least partially projected to a right null space of the first channel matrix.

Clause 26. The electronic device of clause 25, where the at least portion of the plurality of sub-channel matrices provided to the first base station includes all of the plurality of sub-channel matrices, or a remainder of the plurality of sub-channel matrices except for the first portion.

Clause 27. The electronic device of clause 25, where the processing circuit is configured to determine the first portion of the plurality of sub-channel matrices by:
  selecting the first portion from the plurality of sub-channel matrices based on system configuration information;
  autonomously selecting the first portion from the plurality of sub-channel matrices; and/or
  selecting the first portion from the plurality of sub-channel matrices based on an indication from the first base station.

Clause 28. The electronic device of clause 24, where the processing circuit is further configured to:
  design a precoding matrix based on one or more sub-channel matrices of the plurality of sub-channel matrices; and
  use the precoding matrix to perform at least one additional transmission of the downlink reference signal.

Clause 29. The electronic device of clause 25 or clause 28, where the processing circuit is further configured to solve an F-norm for each of the plurality of sub-channel matrices; and the one or more sub-channel matrices of the plurality of sub-channel matrices are sub-channel matrices having a larger F norm.

Clause 30. The electronic device of clause 29, where the processing circuit is configured to decompose the first channel matrix using SVD decomposition, and the one or more sub-channel matrices of the plurality of sub-channel matrices are sub-channel matrices having a larger singular value.

Clause 31. The electronic device of clause 23, where the processing circuit is further configured to:

based on uplink-downlink configuration information of the first base station and the second base station, determine one or more times for uplink reception by the first base station and for downlink transmission by the second base station, where the one or more times include a specific time point of causing the interference; and cancel interference at the one or more times.

Clause 32. A method for wireless communication, including the following operations performed by a first base station:

obtaining channel information of a channel from the second base station to a first base station;

processing the channel information to divide the channel; and providing at least portion of processed channel information to the second base station;

where at least one of the first base station or the second base station cancels, based on the at least portion of the processed channel information, interference caused from downlink transmission of the second base station to uplink reception of the first base station.

Clause 33. The method of clause 32, further including the following operations performed by the first base station:

obtaining a first channel matrix based on the channel information; and decomposing the first channel matrix, such that the first channel matrix is divided into a sum of a plurality of sub-channel matrices.

Clause 34. The method of clause 33, where the providing the at least portion of processed channel information to the second base station includes:

providing, to the second base station, at least portion of the plurality of sub-channel matrices obtained through division of the first channel matrix, where the providing is performed through at least one of a wireless link or a wired interface between the first base station and the second base station.

Clause 35. The method of clause 34, where the cancelling the interference includes:

designing a combining matrix based on one or more sub-channel matrices in a first portion of the plurality of sub-channel matrices obtained through division of the first channel matrix; and performing uplink reception using the combining matrix, such that the interference is at least partially projected to a left null space of the first channel matrix.

Clause 36. The method of clause 35, further including the following operations performed by the first base station:

decomposing the first channel matrix or a second channel matrix using SVD decomposition, where the one or more sub-channel matrices of the plurality of sub-channel matrices or of a second plurality of sub-channel matrices are sub-channel matrices having a larger singular value.

Clause 37. A method for wireless communication, including the following operations performed by a second base station:

receiving at least portion of processed channel information from a first base station; and cancelling, based on the at least portion of the processed channel information, interference caused from downlink transmission of the second base station to uplink reception of the first base station;

where the first base station is configured to execute the method according to any one of clauses 32 to 36.

Clause 38. The method of clause 37, further including the following operations performed by the second base station:

receiving, from the first base station, at least a portion of a plurality of sub-channel matrices obtained through division of a first channel matrix, where the receiving is performed through at least one of a wireless link or a wired interface between the first base station and the second base station.

Clause 39. The method of clause 38, where the cancelling the interference includes:

designing a precoding matrix based on one or more sub-channel matrices in a second portion of the plurality of sub-channel matrices obtained through division of the first channel matrix; and performing downlink transmission using the precoding matrix, such that the interference is at least partially projected to a right null space of the first channel matrix;

where the first portion and the second portion have no intersection, and a union of the first portion and the second portion is a set including the plurality of sub-channel matrices.

Clause 40. The method of clause 39, further including the following operations performed by the second base station:

decomposing the first channel matrix using SVD decomposition, where the one or more sub-channel matrices of the plurality of sub-channel matrices are sub-channel matrices having a larger singular value.

Clause 41. A computer-readable storage medium storing one or more instructions that, when executed by one or more processors of an electronic device, cause the electronic device to perform the method of any one of clauses 32 to 40.

Clause 42. An apparatus for wireless communication, including a unit for performing the method of any one of clauses 32 to 40.

Clause 43. A wireless communication system, including the first base station of any one of clauses 1 to 11 and the second base station of any one of clauses 12 to 20.

Clause 44. A wireless communication system, including the first base station of any one of clauses 1 to 11 and the second base station of any one of clauses 21 to 31.

The exemplary embodiments of the present disclosure have been described above with reference to the drawings, but the present disclosure is of course not limited to the above examples. Those skilled in the art can obtain various changes and modifications within the scope of the appended claims, and it should be understood that these changes and modifications will naturally fall within the technical scope of the present disclosure.

For example, a plurality of functions included in one unit in the above embodiments may be implemented by separate devices. Alternatively, the multiple functions implemented by the multiple units in the above embodiments may be implemented by separate devices, respectively. In addition, one of the above functions can be realized by multiple units. Needless to say, such a configuration is included in the technical scope of the present disclosure.

In this specification, the steps described in the flowchart include not only processes performed in time series in the described order, but also processes performed in parallel or individually rather than necessarily in time series. In addition, even in the steps processed in time series, needless to say, the order can be changed appropriately.

Although the present disclosure and its advantages have been described in detail, it should be understood that various modifications, replacements, and changes can be made without departing from the spirit and scope of the present disclosure as defined by the appended claims. Moreover, the terms "include", "comprise", or their any other variant in the embodiments of the present disclosure is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The invention claimed is:

1. An electronic device for a first base station, comprising a processing circuit, wherein the processing circuit is configured to:
   obtain channel information of a channel from a second base station to the first base station;
   process the channel information to divide the channel; and
   provide at least portion of the processed channel information to the second base station;
   wherein at least one of the first base station or the second base station cancels, based on the at least portion of the processed channel information, interference caused from downlink transmission of the second base station to uplink reception of the first base station,
   wherein the processing the channel information comprises:
   obtaining a first channel matrix based on the channel information; and
   decomposing the first channel matrix, such that the first channel matrix is divided into a sum of a plurality of sub-channel matrices,
   wherein the providing the at least portion of the processed channel information to the second base station comprises:
   providing, to the second base station, at least portion of the plurality of sub-channel matrices obtained through division of the first channel matrix, wherein the providing is performed through at least one of a wireless link or a wired interface between the first base station and the second base station,
   wherein the processing circuit is configured to cancel the interference by:
   designing a combining matrix based on one or more sub-channel matrices in a first portion of the plurality of sub-channel matrices obtained through division of the first channel matrix; and
   performing uplink reception using the combining matrix, such that the interference is at least partially projected to a left null space of the first channel matrix.

2. The electronic device of claim 1, wherein the processing circuit is configured to obtain the channel information by:
   obtaining the channel information by measuring a downlink reference signal of the second base station; and/or
   estimating the channel information based at least on location information between the first base station and the second base station.

3. The electronic device of claim 1, wherein the at least portion of the plurality of sub-channel matrices provided to the second base station comprises all of the plurality of sub-channel matrices, or a remainder of the plurality of sub-channel matrices except for the first portion, and/or
   wherein the processing circuit is configured to determine the first portion of the plurality of sub-channel matrices by:
   selecting the first portion from the plurality of sub-channel matrices based on system configuration information;
   autonomously selecting the first portion from the plurality of sub-channel matrices; and/or
   selecting the first portion from the plurality of sub-channel matrices based on an indication from the second base station.

4. The electronic device of claim 1, wherein the processing circuit is further configured to:
   obtain measurement information through at least one additional transmission of the downlink reference signal of the second base station;
   obtain a second channel matrix based on the measurement information; and
   decompose the second channel matrix, such that the second channel matrix is divided into a sum of a second plurality of sub-channel matrices;
   wherein the additional transmission of the downlink reference signal of the second base station comprises:
   designing a precoding matrix based on one or more sub-channel matrices of the plurality of sub-channel matrices; and
   using the precoding matrix to perform the additional transmission of the downlink reference signal,
   wherein the processing circuit is configured to cancel the interference by:
   designing a combining matrix based on one or more sub-channel matrices of the second plurality of sub-channel matrices; and
   performing uplink reception using the combining matrix, such that the interference is at least partially projected to a left null space of the first channel matrix.

5. The electronic device of claim 1, wherein the processing circuit is further configured to solve an F-norm for each of the plurality of sub- channel matrices or of the second plurality of sub-channel matrices, and
   the one or more sub-channel matrices of the plurality of sub-channel matrices or of the second plurality of sub-channel matrices are sub-channel matrices having a larger F norm.

6. The electronic device of claim 5, wherein the processing circuit is configured to decompose the first channel matrix or the second channel matrix using SVD decomposition, and the one or more sub-channel matrices of the plurality of sub-channel matrices or of the second plurality of sub-channel matrices are sub-channel matrices having a larger singular value.

7. The electronic device of claim 1, wherein the processing circuit is further configured to:
based on uplink-downlink configuration information of the first base station and the second base station, determine one or more times for uplink reception by the first base station and for downlink transmission by the second base station, wherein the one or more times comprise a specific time point of causing the interference; and
cancel interference at the one or more times.

8. A second electronic device for a second base station, wherein the second base station is configured to operate along with the electronic device for the first base station according to claim 1, the second electronic device comprises a second processing circuit, and the second processing circuit is configured to:
receive at least portion of processed channel information from the first base station; and
cancel, based on the at least portion of the processed channel information, interference caused from downlink transmission of the second base station to uplink reception of the first base station.

9. The second electronic device of claim 8, wherein the second processing circuit is further configured to:
receive, from the first base station, at least portion of a plurality of sub-channel matrices obtained through division of a first channel matrix, wherein the receiving is performed through at least one of a wireless link or a wired interface between the first base station and the second base station.

10. The second electronic device of claim 9, wherein the second processing circuit is configured to cancel the interference by:
designing a precoding matrix based on one or more sub-channel matrices in a second portion of the plurality of sub-channel matrices obtained through division of the first channel matrix; and
performing downlink transmission using the precoding matrix, such that the interference is at least partially projected to a right null space of the first channel matrix;
wherein the first portion and the second portion have no intersection, and a union of the first portion and the second portion is a set comprising the plurality of sub-channel matrices.

11. The second electronic device of claim 10, wherein the at least portion of the plurality of sub-channel matrices received from the first base station comprises all or the second portion of the plurality of sub-channel matrices, and/or
wherein the second processing circuit is configured to determine the second portion of the plurality of sub-channel matrices by:
selecting the second portion from the plurality of sub-channel matrices based on system configuration information;
autonomously selecting the second portion from the plurality of sub-channel matrices; and/or
selecting the second portion from the plurality of sub-channel matrices based on an indication from the first base station.

12. The second electronic device of claim 9, wherein the second processing circuit is further configured to:
design a precoding matrix based on one or more sub-channel matrices of the plurality of sub-channel matrices; and
use the precoding matrix to perform the additional transmission of the downlink reference signal.

13. The second electronic device of claim 10, wherein the second processing circuit is further configured to solve an F-norm for each of the plurality of sub-channel matrices; and
the one or more sub-channel matrices of the plurality of sub-channel matrices are sub-channel matrices having a larger F norm.

14. The second electronic device of claim 13, wherein the second processing circuit is configured to decompose the first channel matrix using SVD decomposition, and the one or more sub-channel matrices of the plurality of sub-channel matrices are sub-channel matrices having a larger singular value.

15. The second electronic device of claim 8, wherein the second processing circuit is further configured to:
based on uplink-downlink configuration information of the first base station and the second base station, determine one or more times for uplink reception by the first base station and for downlink transmission by the second base station, wherein the one or more times comprise a specific time point of causing the interference; and
cancel interference at the one or more times.

16. A method for wireless communication, comprising:
by a first base station:
obtaining channel information of a channel from a second base station to the first base station;
processing the channel information to divide the channel; and
providing at least portion of processed channel information to the second base station;
wherein at least one of the first base station or the second base station cancels, based on the at least portion of the processed channel information, interference caused from downlink transmission of the second base station to uplink reception of the first base station,
wherein the processing the channel information comprises:
obtaining a first channel matrix based on the channel information; and
decomposing the first channel matrix, such that the first channel matrix is divided into a sum of a plurality of sub-channel matrices,
wherein the providing the at least portion of the processed channel information to the second base station comprises:
providing, to the second base station, at least portion of the plurality of sub-channel matrices obtained through division of the first channel matrix, wherein the providing is performed through at least one of a wireless link or a wired interface between the first base station and the second base station,
wherein the method further comprises canceling the interference by:
designing a combining matrix based on one or more sub-channel matrices in a first portion of the plurality of sub-channel matrices obtained through division of the first channel matrix; and
performing uplink reception using the combining matrix, such that the interference is at least partially projected to a left null space of the first channel matrix.

* * * * *